(12) United States Patent
Backhaus-Ricoult et al.

(10) Patent No.: US 10,604,451 B2
(45) Date of Patent: Mar. 31, 2020

(54) METHOD OF TREATING A CERAMIC BODY

(71) Applicant: Corning Incorporated, Corning, NY (US)

(72) Inventors: Monika Backhaus-Ricoult, Bourron (FR); Thomas Dale Ketcham, Horseheads, NY (US)

(73) Assignee: Corning Incorporated, Corning, NY (US)

(*) Notice: Subject to any disclaimer, the term of this patent is extended or adjusted under 35 U.S.C. 154(b) by 303 days.

(21) Appl. No.: 15/533,578

(22) PCT Filed: Dec. 8, 2015

(86) PCT No.: PCT/US2015/064358
§ 371 (c)(1),
(2) Date: Jun. 6, 2017

(87) PCT Pub. No.: WO2016/094336
PCT Pub. Date: Jun. 16, 2016

(65) Prior Publication Data
US 2017/0369379 A1 Dec. 28, 2017

Related U.S. Application Data

(60) Provisional application No. 62/090,407, filed on Dec. 11, 2014.

(51) Int. Cl.
*C04B 35/48* (2006.01)
*C03B 5/167* (2006.01)
(Continued)

(52) U.S. Cl.
CPC ............ *C04B 35/481* (2013.01); *C03B 5/163* (2013.01); *C03B 17/064* (2013.01);
(Continued)

(58) Field of Classification Search
CPC ...... C04B 35/481; C03B 5/167; C03B 5/1672; C03B 5/1677; C03B 5/425
See application file for complete search history.

(56) References Cited

U.S. PATENT DOCUMENTS 2,561,818 A 7/1951 Peyches
3,242,060 A 3/1966 Clerc
(Continued)

FOREIGN PATENT DOCUMENTS

DE 1014292 B 7/1957
FR 994796 A 11/1951
(Continued)

OTHER PUBLICATIONS

Baucke and Roth, "Electrochemical mechanism of the oxygen bubble formation at the interface between oxide melts and zirconium silicate refractories" Original Paper, Glastech. Ber. 61 (5), 1988. pp. 109-118.
(Continued)

*Primary Examiner* — Erin Snelting
(74) *Attorney, Agent, or Firm* — Kevin M. Able

(57) ABSTRACT

A method of treating a ceramic body in a glass making process includes delivering a molten glass to a heated ceramic body, the ceramic body including a ceramic phase and an intergranular glass phase, the molten glass being in contact with a surface of the ceramic body. The method further includes contacting the ceramic body with a first electrode and contacting the molten glass with a second electrode. The method further includes applying an electric field between the first electrode and the second electrode to create an electric potential difference across the ceramic body between the first and second electrodes, the electric potential difference being less than an electrolysis threshold of the ceramic phase and the intergranular glass phase. The intergranular glass phase demixes under driven diffusion in
(Continued)

the applied electric field and mobile cations in the intergranular glass phase enrich proximate one of the first and second electrode.

14 Claims, 17 Drawing Sheets

(51) Int. Cl.

| | | |
|---|---|---|
| *C03B 5/16* | (2006.01) | |
| *C03B 17/06* | (2006.01) | |
| *C25B 11/04* | (2006.01) | |
| *H05B 3/03* | (2006.01) | |

(52) U.S. Cl.
CPC ........ *C03B 17/067* (2013.01); *C25B 11/0442* (2013.01); *H05B 3/03* (2013.01); *C03C 2218/13* (2013.01); *C04B 2235/85* (2013.01)

(56) References Cited

U.S. PATENT DOCUMENTS

| | | | |
|---|---|---|---|
| 3,404,020 A | 10/1968 | Woolley | |
| 3,451,798 A | 6/1969 | Simon | |
| 3,537,834 A | 11/1970 | Simon | |
| 3,773,488 A | 11/1973 | Tran et al. | |
| 3,807,980 A | 4/1974 | Boffe et al. | |
| 3,880,630 A | 4/1975 | Izawa | |
| 4,102,665 A | 7/1978 | Plumat et al. | |
| 4,457,958 A | 7/1984 | Lange et al. | |
| 4,466,820 A | 8/1984 | Clarke | |
| 4,874,417 A | 10/1989 | Winterburn | |
| 4,972,305 A | 11/1990 | Blackburn | |
| 5,318,614 A | 6/1994 | Beguin | |
| 5,964,913 A | 10/1999 | Titov et al. | |
| 6,087,971 A | 7/2000 | Clarke et al. | |
| 6,428,920 B1 * | 8/2002 | Badding | ............... C04B 35/016 |
| | | | 428/699 |
| 6,993,936 B2 | 2/2006 | Grzesik et al. | |
| 7,409,839 B2 | 8/2008 | Boratav et al. | |
| 8,383,537 B2 | 2/2013 | Godard et al. | |
| 2012/0047952 A1 | 3/2012 | Addiego et al. | |
| 2012/0141701 A1 * | 6/2012 | Fourcade | .............. C03B 5/1672 |
| | | | 428/34.1 |

FOREIGN PATENT DOCUMENTS

| | | |
|---|---|---|
| KR | 101008091 B1 | 1/2011 |
| NL | 69681 C | 3/1952 |
| SU | 733294 B | 7/1981 |

OTHER PUBLICATIONS

International Search Report and Written Opinion PCT/US2015/064358 dated Jul. 5, 2016.
English Translation of CN201580075774.3 First Office Action dated Jul. 25, 2019, China Patent Office, 8 Pgs.

* cited by examiner

METHOD OF TREATING A CERAMIC BODY

This is a national stage application under 35 U.S.C. § 371 of International Application No. PCT/US15/64358, filed on Dec. 8, 2015, which claims the benefit of priority under 35 U.S.C. § 119 of U.S. Provisional Application Ser. No. 62/090,407 filed on Dec. 11, 2014 the content of which is relied upon and incorporated herein by reference in its entirety.

FIELD

The following description relates generally to methods of treating a ceramic body and, more particularly, to methods of treating the ceramic body by applying a potential gradient to the ceramic body.

BACKGROUND

It is known to fabricate glass sheets or ribbons by flowing molten glass to a forming device including a ceramic body. It is also known that ceramic materials containing substantial concentrations of impurities are not desired for use in a forming body used in the fabrication of glass sheets or ribbons.

SUMMARY

The following presents a simplified summary of the disclosure in order to provide a basic understanding of some example aspects described in the detailed description.

In accordance with a first aspect, a method of treating a ceramic body in a glass making process includes delivering a molten glass to the ceramic body while heated, the ceramic body including a ceramic phase and an intergranular glass phase, the molten glass being in contact with a surface of the ceramic body. The method further includes contacting the ceramic body with a first electrode and contacting the molten glass with a second electrode. The method further includes applying an electric field between the first electrode and the second electrode to create an electric potential difference across the ceramic body between the first and second electrodes, the electric potential difference being less than an electrolysis threshold of the ceramic phase and the intergranular glass phase. The intergranular glass phase demixes under driven diffusion in the applied electric field and mobile cations in the intergranular glass phase enrich proximate one of the first and second electrode.

In one example of the first aspect, the mobile cations are diffused from the surface of the ceramic body into the molten glass. In another example of the first aspect, the enriching of the mobile cations occurs within a bulk of the ceramic body. In still another example of the first aspect, the ceramic body includes zircon.

In yet another example of the first aspect, the electric potential difference across the ceramic body is equal to or less than about 1.8 V. In another example, the electric potential difference across the ceramic body is in a range from about 0.2 V to about 1.8 V.

In a further example of the first aspect, a temperature of the ceramic body during the applying of the electric field is at least about 1000° C. In another example of the first aspect, the first electrode includes platinum. In yet another example, the first electrode further includes a yttrium-stabilized zirconia. In still another example of the first aspect, the first electrode includes a metal oxide.

In yet another example of the first aspect, at least one of the first electrode and the second electrode includes at least one of an electrically conductive ceramic and an electrically conductive carbon. In a still further example of the first aspect, the applying of the electric field includes inverting polarities on one or more occasions. In an additional example of the first aspect, the ceramic body includes one or more openings or bores. In yet another example of the first aspect, the one or more openings or bores include one of the first and second electrodes.

The first aspect can be provided alone or in combination with one or any combination of the examples of the first aspect discussed above.

In accordance with a second aspect, a method of treating a ceramic body includes applying a porous ceramic layer to an outside surface of the ceramic body. The ceramic body includes a ceramic phase and an intergranular glass phase. The method further includes applying a first electrode paste layer to the outside surface of the ceramic body. The method still further includes applying a second electrode paste layer to the outside surface of the ceramic body spaced apart from the first electrode paste layer. The method still further includes sintering the first and second paste layers to form first and second electrodes. In addition, the method includes heating the ceramic body. The method further includes applying an electric field between the first electrode and the second electrode to create an electric potential difference across the ceramic body between the first and second electrodes, the electric potential difference being less than an electrolysis threshold of the ceramic phase and the intergranular glass phase. The intergranular glass phase demixes under driven diffusion in the established electric field and mobile cations in the intergranular glass phase enrich in the porous ceramic layer.

In one example of the second aspect, the method further includes removing at least a portion of the porous ceramic layer.

In another example of the second aspect, the ceramic body is heated to a temperature equal to or greater than about 1000° C.

In still another example of the second aspect, the ceramic body includes zircon.

In yet another example of the second aspect, the electric potential difference between the first and second electrodes is equal to or less than about 1.8 V. In another example, the electric potential difference between the first and second electrodes is in a range from about 0.2 V to about 1.8 V.

The second aspect can be provided alone or in combination with one or any combination of the examples of the second aspect discussed above.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Figure 1:
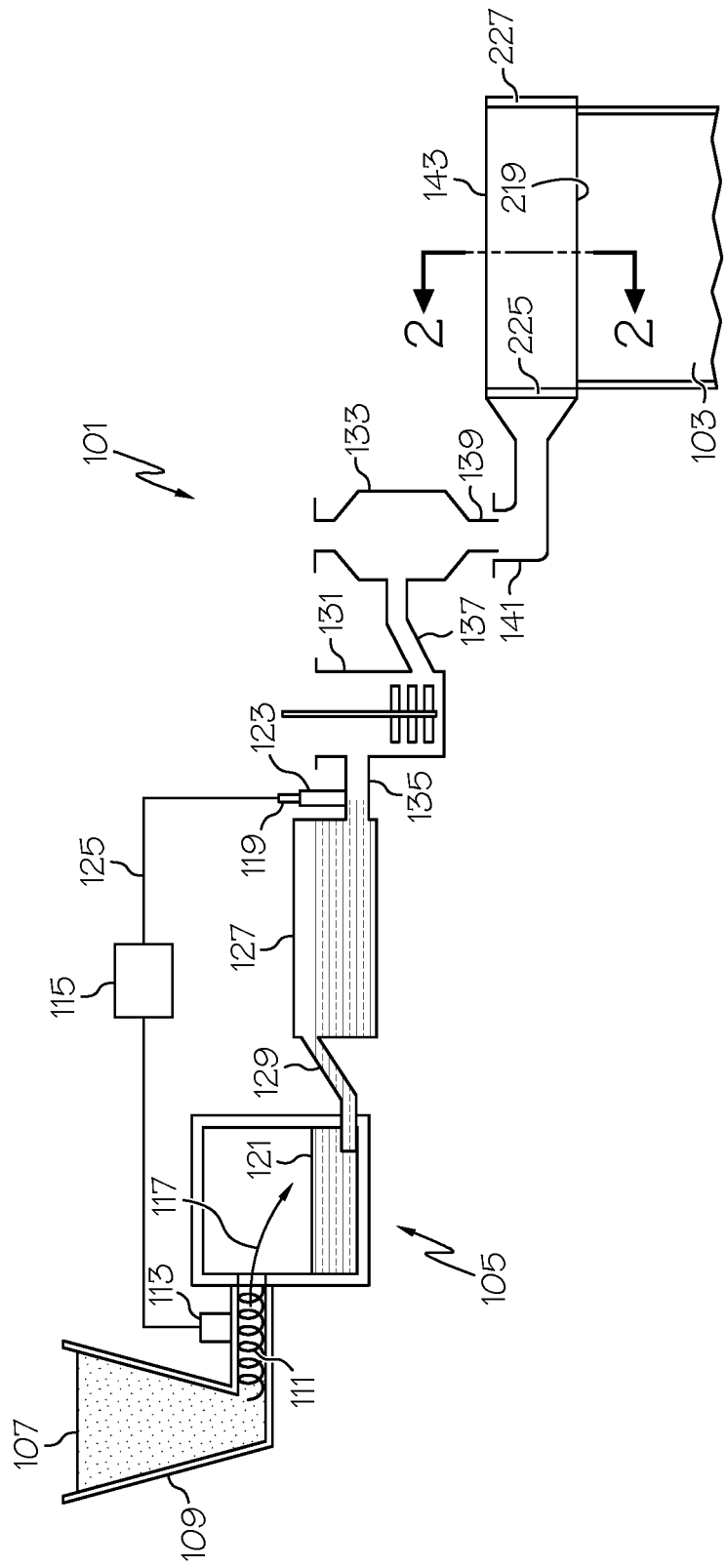
FIG. 1 is a schematic view illustrating an example of a glass manufacturing apparatus including a forming device.

Apparatuses and methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

For purposes of this discussion, the terms "migrate", "migration", or "migrating" refer to movement of ions and vacancies within a forming device with or without any potential gradient.

For purposes of this discussion, the term "lattice" refers to a crystalline structure where cations and anions are arranged periodically in a 3D space and also to glasses where charged ions are arranged in a structure including, but not limited to, next neighbors and next-next neighbors, such that an overall global charge neutrality is respected.

For purposes of this discussion, the term "electrolysis" refers to a process by which a compound is separated in a non-spontaneous reaction under input of electric energy into its components, constituents, and elements. For example, the term "electrolysis" may refer to phase separation or phase decomposition under simultaneous oxidation of one part of the compound and reduction of another. In an example of electrolysis of a solid or glass phase, the electric energy must be sufficient to not only overcome the forming energy of the phase, but also provide excess energy for nucleation of the electrolysis products. Such excess energy may be required for, but not limited to formation of interfaces and overcoming strain energy in case of reaction-related volume changes.

Unless otherwise indicated, units for electric potential difference are given in volts (V or VDC for a direct current system) and electric current or electric current density is given in units of amps (A), milliamps (mA), amps per square centimeter ($A/cm^2$), or milliamps per square centimeter ($mA/cm^2$).

For purposes of this discussion, the term "mobile ions" refers to metal cations occupying the lattices of material of a ceramic body, such as, but not limited to, lithium (Li$^+$), sodium (Na$^+$), potassium (K$^+$), calcium (Ca$^{2+}$), magnesium (Mg$^{2+}$), titanium (Ti$^{4+}$), zirconium (Zr$^{4+}$), and iron (Fe$^{3+}$) ions. For simplicity reasons, simple ion oxidation states are used, even if it is well known to those who are familiar with the state of the art that the charge transfer is only partial and atom charge states differ. Further, the term "mobile ions" refers to either cations or anions that are mobile under a potential gradient, such as an electric field. Therefore, "mobile ions", "mobile cations" or "mobile anions" can be interchangeably used throughout the present disclosure.

For purposes of this discussion, the term "treatment" refers to a combination of thermal treatment at an elevated temperature and an application of potential gradient across a ceramic body that are related to the migration of mobile ions in the ceramic body in a controlled direction. For purposes of this discussion, the term "as-processed" refers to situations in which no treatment occurs. For example, "as-processed forming device" refers to a forming device that is manufactured by means of one or more predetermined manufacturing steps, and is not subject to any "treatment" after the manufacturing.

For purposes of this discussion, while a forming device and a ceramic body are occasionally stated to include zircon, embodiments described herein are not limited thereto. For example, the forming device may include or consist of monazite, mullite, zircon, zirconia, alumina, or low creep zircon.

FIG. 1 is a schematic view illustrating an example of a glass manufacturing apparatus 101 including a forming device 143. The glass manufacturing apparatus 101 is configured to fusion-draw a glass ribbon 103 for subsequent processing into glass sheets and includes a fusion draw apparatus, although other fusion forming apparatuses may be provided in further examples. The glass manufacturing apparatus 101 can include a melting vessel 105 (e.g., melting furnace) configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by an arrow 117. A glass level probe 119 can be used to measure a glass melt (e.g. molten glass) 121 level within a standpipe 123 and communicate the measured information to the controller 115 by way of a communication line 125.

The glass manufacturing apparatus 101 can also include a fining vessel 127, such as a fining tube, located downstream from the melting vessel 105 and fluidly coupled to the melting vessel 105 by way of a first connecting tube 129. A mixing vessel 131, such as a stir chamber, can also be located downstream from the fining vessel 127 and a delivery vessel 133 may be located downstream from the mixing vessel 131. As shown, a second connecting tube 135 can couple the fining vessel 127 to the mixing vessel 131 and a third connecting tube 137 can couple the mixing vessel 131 to the delivery vessel 133. As further illustrated, a downcomer 139 can be positioned to deliver molten glass 121 from the delivery vessel 133 to an inlet 141 of a forming device 143. As shown, the melting vessel 105, fining vessel 127, mixing vessel 131, delivery vessel 133, and forming device 143 are examples of glass melt stations that may be located in series along the glass manufacturing apparatus 101.

The melting vessel 105 is typically made from a refractory material, such as ceramic brick. The glass manufacturing apparatus 101 may further include components that are typically made from a refractory metal, including platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The refractory metal components can include one or more of the first connecting tube 129, the fining vessel 127 (e.g., finer tube), the second connecting tube 135, the standpipe 123, the mixing vessel 131 (e.g., a stir chamber), the third connecting tube 137, the delivery vessel 133, the downcomer 139 and the inlet 141.

Figure 2:
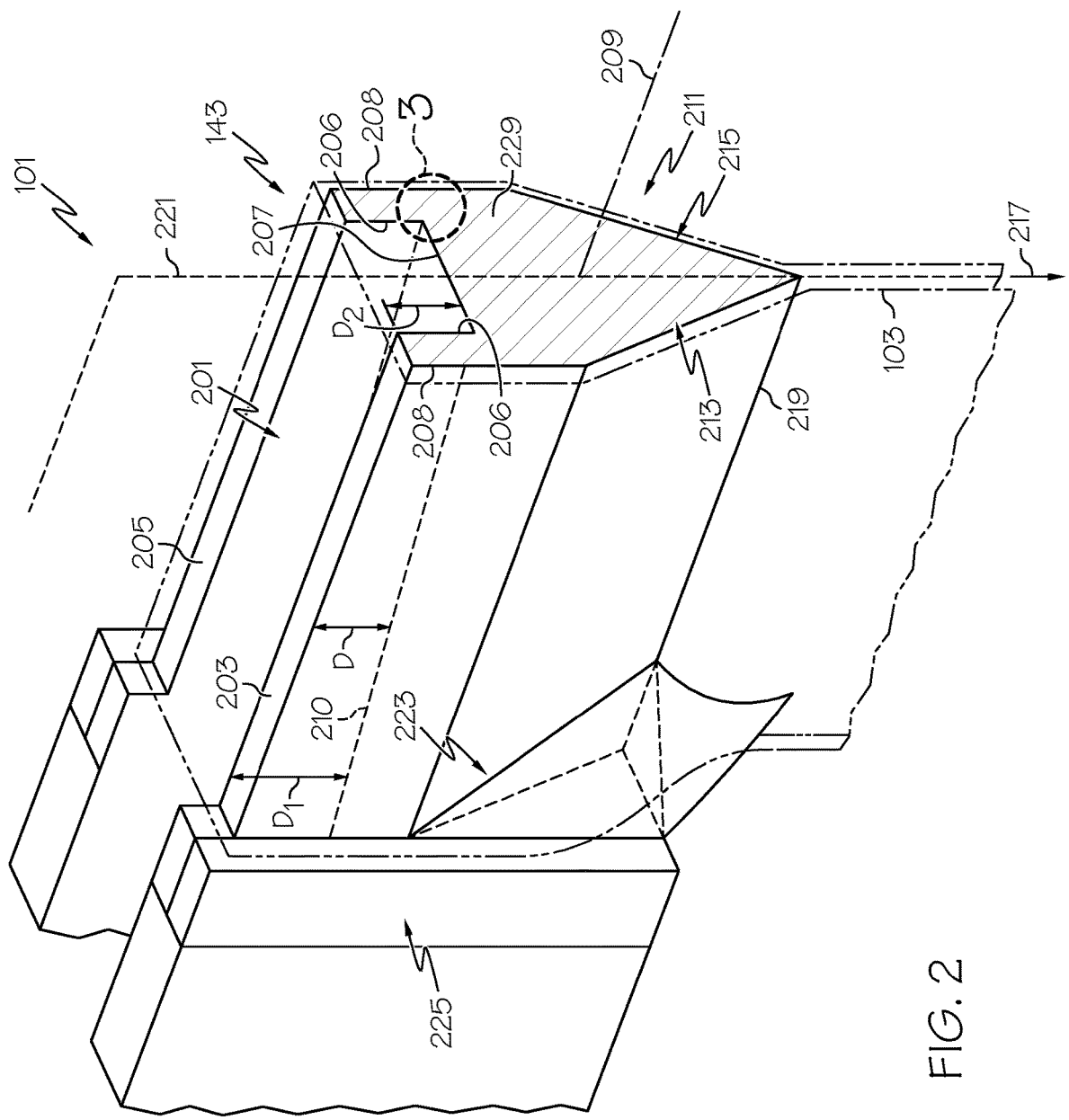
FIG. 2 is a cross-sectional enlarged perspective view illustrating an example of the forming device along line 2-2 of FIG. 1.

FIG. 2 is a cross-sectional enlarged perspective view illustrating an example of the forming device 143 along line 2-2 of FIG. 1. The forming device 143 includes a ceramic body 229 that is made of a refractory ceramic material and is designed to form the glass ribbon 103. As illustrated in FIG. 2, the entire body of the forming device 143 can include the ceramic body 229. In another example, the ceramic body 229 is formed as an outer layer on an exterior of the forming device 143 such that the molten glass contacts only the ceramic body 229. For example, the ceramic body 229 can have a predetermined thickness formed on an exterior surface of the forming device 143.

The forming device 143 can include a trough 201 at least partially defined by a pair of weirs comprising a first weir 203 and a second weir 205 defining opposite sides of the trough 201. As further shown, the trough 201 may also be at least partially defined by a bottom wall 207. As shown, inner surfaces 206 of the weirs 203, 205 and the bottom wall 207 define a substantially U shape that may be provided with round corners. In further examples, the U shape may have surfaces substantially 90° relative to one another. In still further examples, the trough may have a bottom surface defined by an intersection of the inner surfaces 206 of the weirs 203, 205. For example, the trough may have a V-shaped profile. Although not shown, the trough can include further configurations in additional examples.

As shown, the trough 201 can have a depth "D" between a top of the weir and a lower portion of the trough 201 that varies along an axis 209 although the depth may be substantially the same along the axis 209. Varying the depth "D" of the trough 201 may facilitate consistency in glass ribbon thickness across the width of the glass ribbon 103. In just one example, as shown in FIG. 2, the depth "$D_1$" near the inlet of the forming device 143 can be greater than the depth "$D_2$" of the trough 201 at a location downstream from the inlet of the trough 201. As demonstrated by the dashed line 210, the bottom wall 207 may extend at an acute angle relative to the axis 209 to provide a substantially continuous reduction in depth along a length of the forming device 143 from the inlet end to the opposite end.

The forming device 143 can further include a forming wedge 211 including a pair of downwardly inclined forming surface portions 213, 215 extending between opposed ends of the forming wedge 211 and from outer surfaces 208 of the weirs 203, 205 to a root 219. The pair of downwardly inclined forming surface portions 213, 215 converges along a downstream direction 217 to form the root 219. The root 219 lies within a draw plane 221 wherein the glass ribbon 103 may be drawn in the downstream direction 217 along the draw plane 221. As shown, the draw plane 221 can be a vertical draw plane although the draw plane 221 may extend at other orientations with respect to the root 219.

The forming device 143 may optionally be provided with one or more edge directors 223. The edge directors 223 may serve to mitigate the effects of attenuation (lateral shrinkage) of the flow of molten glass over the forming surfaces. In some examples, the edge directors may also indirectly or directly heat edges of the glass ribbon passing thereover. For example, as shown in FIG. 2, the edge director 223 can be positioned at a first opposed end 225. A second identical edge director (not shown in FIG. 2) can be positioned at a second opposed end 227 illustrated in FIG. 1. The edge directors 223 may be configured to intersect with at least one of the pair of downwardly inclined forming surface portions 213, 215. In further examples, the edge directors 223 intersect with both downwardly inclined forming surface portions 213, 215. In further examples, an edge director 223 is positioned at each of the opposed ends of the forming wedge 211.

While each edge director 223 may substantially correspond to the descriptions above, embodiments disclosed herein are not limited thereto, as various forming wedge and edge director configurations may be applied thereto. For example, embodiments described herein may be used with forming wedges and edge director configurations disclosed in U.S. Pat. Nos. 3,451,798, 3,537,834 and/or U.S. Pat. No. 7,409,839, each of which is incorporated herein by reference.

Figure 3:
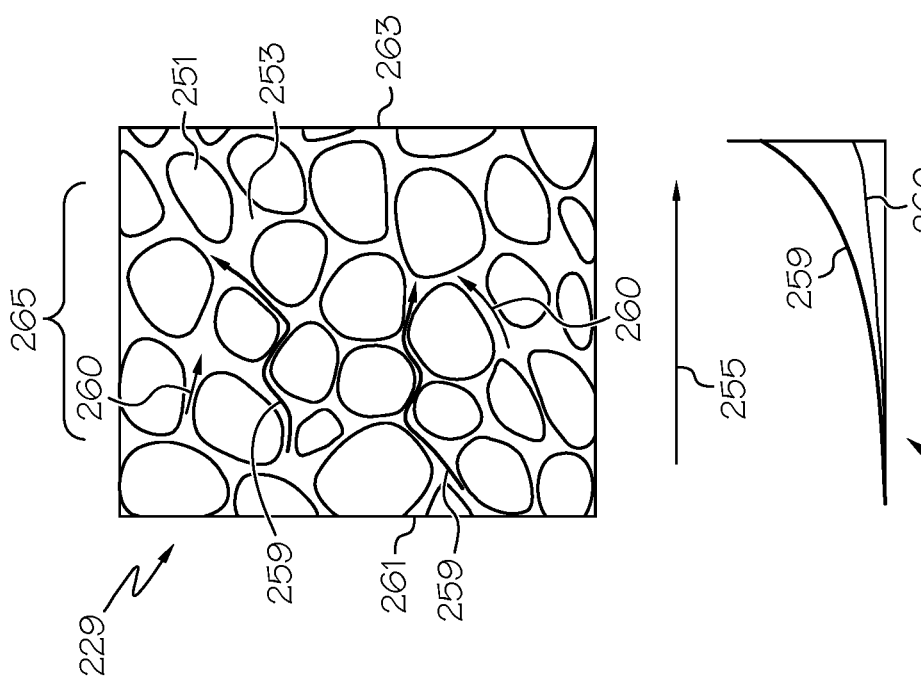
FIG. 3 is an enlarged schematic view illustrating an example of the movement of mobile ions in a ceramic body under a potential gradient, including but not limited to a concentration gradient, a temperature gradient, an electric potential difference, a stress gradient or a combination of thereof in the forming device of FIG. 2 at area 3.

FIG. 3 is an enlarged schematic view illustrating an example of the movement of mobile ions in a ceramic body 229 under a potential gradient in the forming device 143 of FIG. 2 in area 3. The ceramic body 229 of the forming device 143 as illustrated in FIG. 3 includes a ceramic phase 251 having a plurality of grains and an intergranular glass phase 253. The ceramic phase 251 may include one or more crystalline phases and/or crystalline grains. The ceramic phase 251 may further include a crystalline lattice occupied by one or more ions and electrons on a periodic arrangement, as opposed to the intergranular glass phase 253 where the ions and electrons may not be arranged in a periodic structure. While the ceramic body 229 illustrated in FIG. 3 includes zircon ($ZrSiO_4$), the ceramic body 229 may additionally include monazite (($Ca,La)PO_4$), mullite (3 $Al_2O_3 \cdot 2SiO_2$), alumina ($Al_2O_3$), low creep zircon, or other ceramic oxides that are thermally stable at elevated temperatures.

The intergranular glass phase 253 may represent a grain boundary region between adjacent grains of the ceramic phase 251. The intergranular glass phase 253 and the adjacent grains of the ceramic phase 251 are connected to each other to form a continuous path in the ceramic body 229. The intergranular glass phase 253 may surround one or more grains of the ceramic phase 251.

While the chemical composition of the intergranular glass phase 253 may include one or more constituents of the crystalline grains of the ceramic phase 251, embodiments described herein are not limited thereto. For example, the intergranular glass phase 253 may further include impurity ions and/or dopants that are incorporated in relatively small global quantities from the manufacturing of the forming device 143. The impurity ions may include at least one of alkali ions [e.g. lithium ($Li^+$), sodium ($Na^+$), potassium ($K^+$)], alkali earth ions [e.g., calcium ($Ca^{2+}$), magnesium ($Mg^{2+}$)], transition metal ions [e.g. titanium ($Ti^{4+}$), iron ($Fe^{3+}$), chromium ($Cr^{3+}$), manganese ($Mn^{3+}$, $Mn^{4+}$), tin ($Sn^{2+}$, $Sn^{4+}$)], aluminum ions ($Al^{3+}$), and heavy metal ions, such as tantalum, tungsten, molybdenum, and vanadium ions. In an example, the impurity ions are incorporated from a mold used for forming a shape of the forming device 143. In another example, a controlled amount of the impurity ions is added to a batch used to manufacture the forming device 143 in order to control a condition of the forming device 143 through the manufacturing process.

The intergranular glass phase 253 having impurity ions may have a melting temperature that is less than a melting temperature of the crystalline phase of the grains of the ceramic phase 251. In an example, depending on the type of impurity ions, as an amount of the impurity ions increases, the melting temperature of the intergranular glass phase 253 may decrease correspondingly. The melting temperature of the intergranular glass phase 253 having impurity ions may be less than the melting temperature of the grains of the ceramic phase 251 by several tens or even hundreds of degrees. As such, the intergranular glass phase 253 may expedite mass transfer for densification during high temperature sintering of the forming device 143. As a result, the ceramic body 229 of the forming device 143, having impurity ions, may be densified within a temperature range that is less than a sintering temperature of a chemically pure forming device that does not include any impurity ions.

Migration of ion species under a potential gradient may occur at different migration rates since individual ion species have different mobilities and, in addition, possess a variety of individual coupling conditions during migration under the potential gradient that modify their resulting effective mobility. The potential gradient may be implemented by at least one of a concentration gradient, a chemical gradient, a temperature gradient, an electric potential difference or gradient, a stress gradient, and a strain gradient in the ceramic body 229 of the forming device 143. Until a new steady state is reached for the distribution of the ion species under the potential gradient, highly mobile ions migrate relatively farther and faster than ions possessing low mobility.

In the example illustrated in FIG. 3, the distribution of mobile ions in the ceramic body 229 under a potential gradient is represented by a concentration profile 285 of mobile ions with relatively high mobility 259 and mobile ions with relatively low mobility 260 in the applied general potential gradient. Phase composition into the constituents occurs when the generalized potential gradient provides the energy for decomposition of the compound into its constituents. For purposes of this discussion, electrolysis is the electrical potential gradient-related, electric energy-assisted decomposition of the compound.

When the applied potential gradient provides less energy than the energy of the formation of the compound and, thus, is below an electrolysis threshold, the migration of ions in the ceramic body 229 does not induce the phase decomposition of the ceramic body 229 and may lead only to a spatial redistribution of the mobile ions, which is referred to herein as "demixing". Above the electrolysis threshold of the potential gradient, the energy coupled to the potential gradient may be equal to or greater than the formation energy of the compound that includes the ceramic body 229 and theoretically leads to decomposition of the compound associated with electrolysis. Such electrolysis occurs under destruction of the crystalline phase and the crystal lattice. While the above criterion may describe a thermodynamic bulk balance, the onset of the electrolysis of a material may be delayed due to a need of additional energy for nucleation, interface formation, and overcoming strain energies.

In the compound, mobile ions may migrate under the potential gradient toward the negative potential. Different migration mechanisms can be activated, such as, but not limited to, exchanges with point defects such as vacancies or interstitials in ordered crystalline solids or density/fluctuation perturbations that allow migration of more loosely bonded atoms in glassy structures. In the case of an electric field that produces a potential gradient, based on charge considerations, cations may migrate toward an area of negative potential while anions may migrate toward an area of positive potential. For example, mobile cations may migrate along the potential gradient from an area of positive potential 261 to an area of negative potential 263 within the ceramic body 229 in the direction illustrated by the arrow 255 in FIG. 3. Cations with higher mobility may migrate faster than cations with lower mobility. As a result, the positive potential area 261 and an interior 265 of the ceramic body 229 may be relatively depleted of cations with high mobility. Correspondingly, a concentration of the highly mobile ions in the negative potential area 263 would sharply increase.

Figure 4:
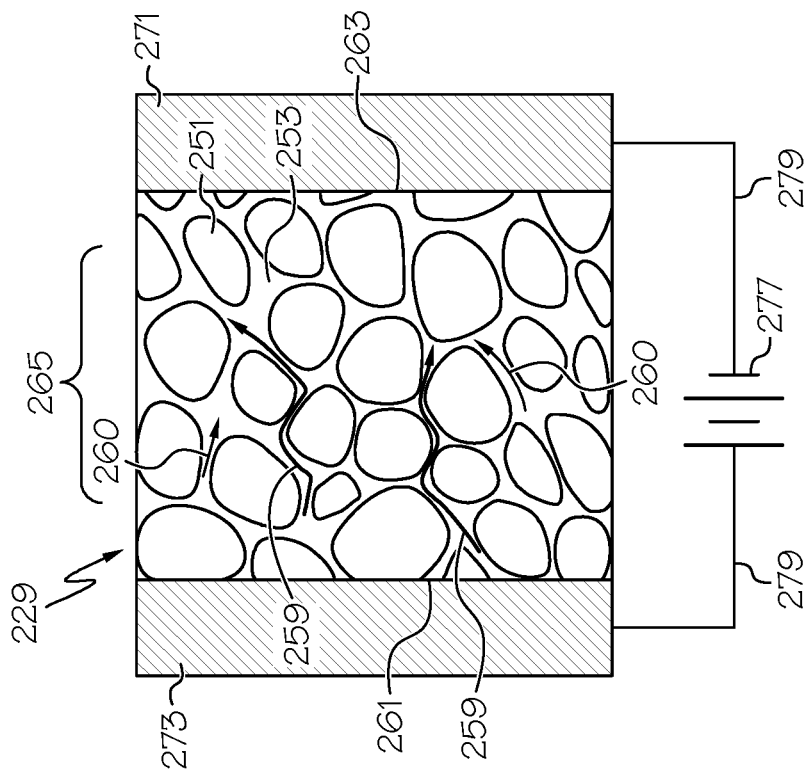
FIG. 4 is a schematic view illustrating an example of the ceramic body illustrated in FIG. 3 under the electric potential difference with a cathode and an anode attached to opposite sides of the ceramic body.

A schematic view illustrating an example of the ceramic body 229 of the forming device 143 illustrated in FIG. 3 with a cathode 271 and an anode 273 attached to opposite sides of the ceramic body 229 is shown in FIG. 4. As illustrated in FIG. 4, the ceramic body 229 is contacted by two electrodes, e.g. a cathode 271 and an anode 273. The operational arrangement of the two electrodes may be positioned to apply an electric field having a predetermined magnitude across the ceramic body 229. The two electrodes 271, 273 may be operably coupled to a voltage power supply 277 by lead wires 279. The polarity of the voltage power supply 277 may be inversed during the treatment.

Further, the electric field may be applied to the ceramic body 229 for variable periods ranging from about one hour up to greater than about 100 hours, depending on the treatment temperature, until the mobile ions migrate to the surface of the ceramic body 229 proximate the cathode 271. When the mobile ions reach the surface of the ceramic body 229 proximate the cathode 271, the ions may not move any further, especially if a metallic conductor, such as, but not limited to, Pt, is used as the cathode 271 to block the migration of mobile ions. Instead, the mobile ions may be enriched at the surface proximate the cathode 271. As a result, the concentration of mobile ions enriched at the surface proximate the cathode 271 may further increase according to a duration during which an electric field is applied until a steady state concentration profile is reached. After pre-set time periods, the concentration of mobile ions across a thickness of the ceramic body 229 may be represented by a concentration profile 285 of mobile ions with relatively high mobility 259 and mobile ions with relatively low mobility 260, as is illustrated in FIG. 3, that decreases from the cathode side to the anode side. After treating the ceramic body 229, the surface enriched by the mobile ions may be mechanically removed by a grinding or a polishing to obtain an extremely low mobile ion level in at least a portion, if not an entirety of, the forming device 143.

In this example, with respect to the migration of mobile ions, when the electric field applied to the ceramic body 229 is less than the electrolysis threshold and kinetic demixing occurs without decomposition of the ceramic body 229, the magnitude of electric potential difference is smaller than the formation energy of the one or more phases of the ceramic body 229. On the other hand, when the magnitude of the electric field applied to the ceramic body 229 is greater than the electrolysis threshold, both demixing and electrolysis may occur. For example, cation vacancies generated by the displacement of cations from their lattice sites or oxygen ions ($O^{2-}$) may migrate toward the anode 273 such that the ceramic body 229 is separated in a non-reversible reaction, in which the integrity of the ceramic body 229 would not be maintained.

The electrolysis reaction may also be represented in thermodynamic terms and relations. When an electric potential difference is large enough to overcome the Gibbs energy of formation, $\Delta Gf$, of the compound, e.g., a multi-component oxide, electrolysis may occur. Table 1 shows the Gibbs energy of formation, $\Delta Gf$ (KJ/mol), and the electrolysis threshold, $U_{decomposition}$, for zircon ($ZrSiO_4$) based on thermodynamic data using the following mathematical equation:

$$G = -n \cdot F \cdot U_{decomposition} \quad (1)$$

where n is the moles of electrons and F is the Faraday constant (96500 C/mol).

TABLE 1

Gibbs energy for formation in kiloJoules/mole (kJ/mol) and electrolysis threshold in volts for decomposition of zircon with temperature

| Temperature (K) | $\Delta Gf$ (kJ/mol) | $U_{decomposition}$ (V) |
| --- | --- | --- |
| 1000 | −1644.68 | −2.13 |
| 1100 | −1608.00 | −2.08 |
| 1200 | −1571.00 | −2.03 |
| 1300 | −1534.00 | −1.99 |
| 1400 | −1498.00 | −1.94 |
| 1500 | −1462.00 | −1.89 |
| 1600 | −1425.00 | −1.85 |
| 1700 | −1389.00 | −1.80 |
| 1800 | −1350.00 | −1.75 |

As shown in Table 1, the calculated electrolysis threshold, $U_{decomposition}$, for zircon may range from 1.75 V and 2.13 V at temperatures between about 1000 K and about 1800 K, respectively. As an example, at about 1400 K, zircon may remain stable in its compound form until 1.94 V is applied. When the electric potential difference greater than 1.94 V is applied, zircon may decompose according to the following chemical reaction:

$$ZrSiO_4 \rightarrow Zr_xSi_y(O) + O_2 \quad (2)$$

where $Zr_xSi_y(O)$ is one or more intermetallics, metallic alloys, or pure metals of zirconium and silicon that can contain oxygen in solid solution.

The electrolysis threshold, $U_{decomposition}$, in Table 1 is not limited to being identical to the nominal electric potential supplied from the voltage power supply 277 in embodiments described herein. For example, differences between the electrolysis threshold and the electric potential from the voltage power supply 277 could be from the contribution of extrinsic parameters, such as, but not limited to, a voltage drop across the interface between the electrode 271 and the ceramic body 229 or the anode 273 and the ceramic body 229 or a voltage drop due to the resistance along the lead wire 279. As such, the electrolysis threshold, $U_{decomposition}$, shown in Table 1 may be less than the electric potential supplied from the voltage power supply 277.

The cathode 271 and the anode 273 may include one or more metallic conductors, such as, but not limited to, platinum (Pt) or tungsten (W). The cathode 271 and the anode 273 may include carbon (C). In another example, electrically conducting ceramics, such as, but not limited to, perovskite structured $ABO_3$ materials, e.g., $La_{1-x}Sr_xCoO_3$ or $La_{1-x}Sr_xMnO_3$, are used as the cathode 271 or the anode 273 alone or in combination with the metallic conductors. In yet another example, electrically conductive carbon, e.g., graphite, carbon nanotubes, or graphene, is used as the cathode 271 or the anode 273 alone or in combination with the electrically conducting ceramics or the metallic conductors. The cathode 271 and the anode 273 may be formed on the surface of the ceramic body 229 using any number of different forming techniques, such as, but not limited to, sputtering, evaporation, atomic layer deposition, chemical vapor deposition, screen printing, and spray coating.

Figure 5:
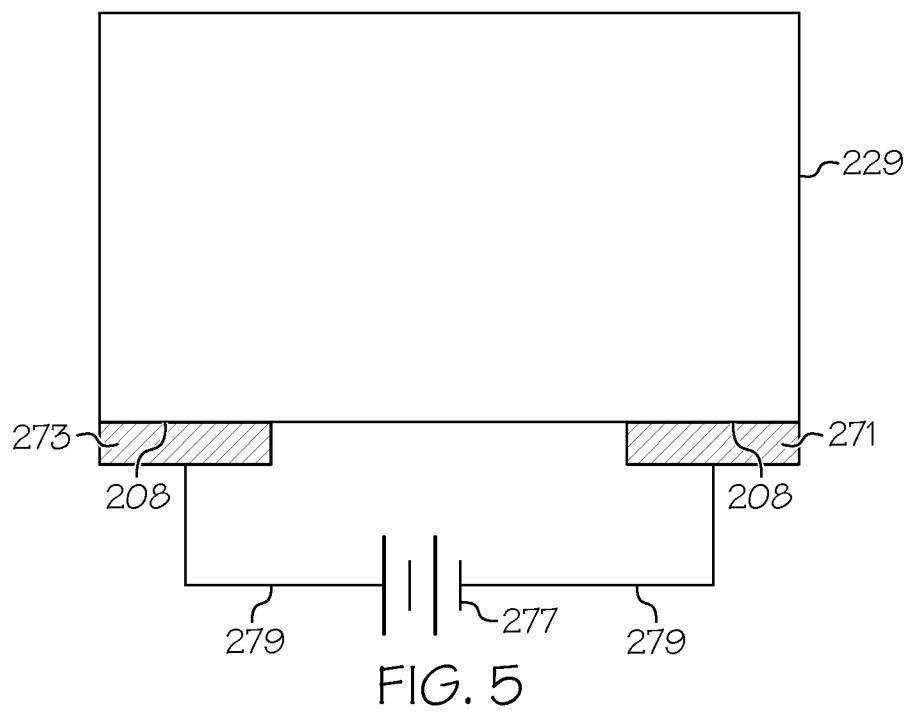
FIG. 5 is a schematic view illustrating an example of the ceramic body of FIG. 4 with the cathode and the anode attached on the same side of the ceramic body.

FIG. 5 is a schematic view illustrating an example of the ceramic body 229 of FIG. 4 with the cathode 271 and the anode 273 attached on the same side of the ceramic body 229. While both the cathode 271 and the anode 273 may be formed on opposite surfaces, as is illustrated in FIG. 4, the example illustrated in FIG. 5 shows that the cathode 271 and the anode 273 may also be placed on the same surface, such as, for example, the inner surface 206 or the outer surface 208 of the ceramic body 229. When the cathode 271 and the anode 273 are formed on the same surface of the ceramic body 229, the electric field lines in the ceramic body 229 may continue to force the mobile ions to migrate from one electrode toward the other, depending on a polarity of the mobile ions.

Figure 6:
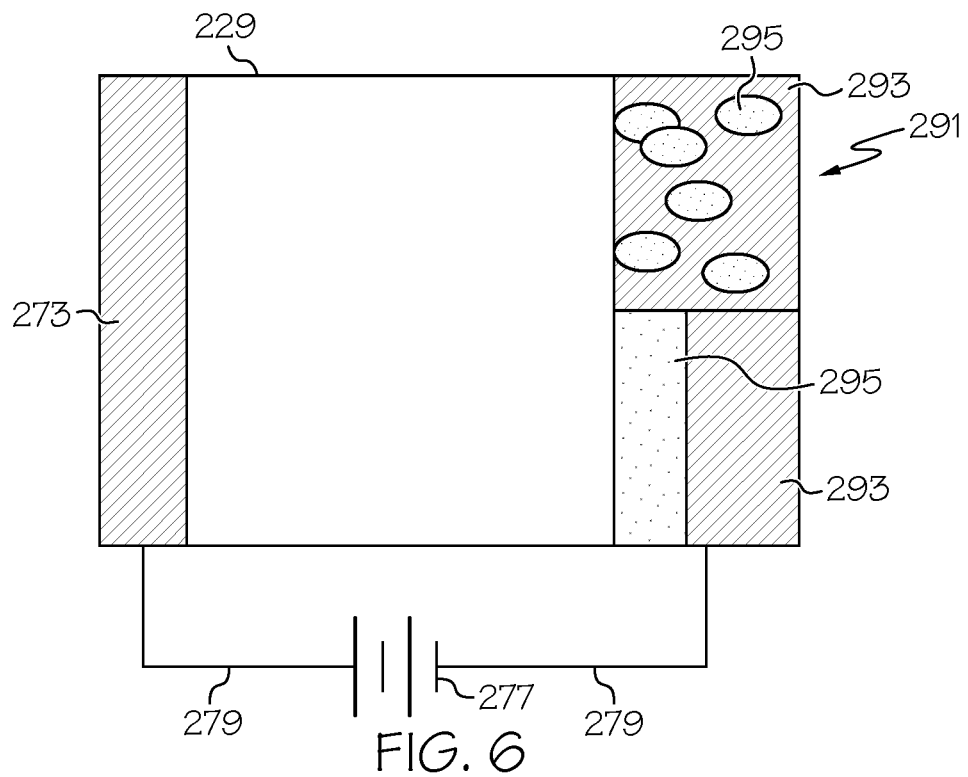
FIG. 6 is a schematic view illustrating an example of the ceramic body of FIG. 4 including a storage electrode formed on a surface proximate to the cathode of the ceramic body.

FIG. 6 is a schematic view illustrating and example of the ceramic body 229 of FIG. 4 including a storage electrode 291 formed on a surface proximate to the cathode 271 of the ceramic body 229. The storage electrode 291 may include the metallic conductor 293 and porous ceramic 295 designed to physically or chemically absorb mobile ions enriched at the surface of the ceramic body 229. In one example, the porous ceramic 295 includes yttrium-stabilized zirconia (YSZ) such as 3 mol % yttrium-stabilized zirconia (3YSZ) while other porous ceramic materials, for example, porous ceria or zeolite, may be used. The porous ceramic 295 may be arranged with the metallic conductor 293 in a plurality of configurations. In one example, as shown in the lower portion of the storage electrode 291 in FIG. 6, the porous ceramic 295 having a predetermined thickness is formed directly on the surface of the ceramic body 229. For example, 3YSZ ceramic powder with a controlled powder size distribution may be mixed with an organic binder and a solvent to form an ink. The ink may be screen printed on the surface of the ceramic body 229. The surface may then be dried and sintered at a predetermined temperature to form the porous ceramic 295 in such a way that it fully adheres to the surface of the ceramic body 229.

The processing parameters may be controlled to modify a microstructure of 3YSZ. For example, composition of the ink such as a pore former, a sintering temperature, and/or a particle size distribution of 3YSZ may be determined to control a porosity and/or a specific surface area of the porous ceramic 295. Subsequently, the metallic conductor 293, which may include Pt, may be formed on a top of the porous ceramic 295 by at least one of sputtering, evaporation, spraying, and printing.

When an electric field is applied across the storage electrode 291 and the anode 273, the mobile ions may migrate toward the surface proximate the storage electrode 291. The mobile ions may continue to migrate into the storage electrode 291. In one example, the mobile ions are driven by the composition difference if the storage electrode 291 is pure. In another example, the mobile ions are driven by capillary forces in case the storage electrode 291 includes fine pores. As the mobile ions are not enriched at the surface of the ceramic body 229, but in the porous ceramic 295 outside of the surface of the ceramic body 229, only the storage electrode 291 may be mechanically removed without affecting the thickness of the ceramic body 229.

In another example, even when a portion of the mobile ions is collected at the surface of the ceramic body 229 in the presence of the storage electrode 291 due to, for example, a limited surface area of the storage electrode 291, that portion of the mobile ions may be small compared to a portion of the mobile ions collected by the storage electrode 291. As such, the thickness of the surface of the ceramic body 229, enriched by the mobile ions, may be significantly less than a thickness of the ceramic body 229 as a whole.

In another example, as shown in the upper portion of the storage electrode 291 of FIG. 6, the porous ceramic 295 is uniformly mixed with the metallic conductor 293 to disperse the porous ceramic 295 within the storage electrode 291 as the cathode. For example, both 3YSZ ceramic powder of the porous ceramic 295 and metallic Pt flake (or powder) of the metallic conductor 293 may be mixed with an organic binder and a solvent to form ink. The ink may then be dried and sintered at a predetermined temperature to form a Pt/3YSZ-including storage electrode 291 with an interconnected structure between the metallic conductor 293 and the porous ceramic 295. When the electric field is applied across the storage electrode 291 and the anode 273, some mobile ions may be received by the porous ceramic 295 proximate the surface of the ceramic body 229. Other mobile ions may migrate through the interconnected structure until other mobile ions are adsorbed by the porous ceramic 295.

Figure 7:
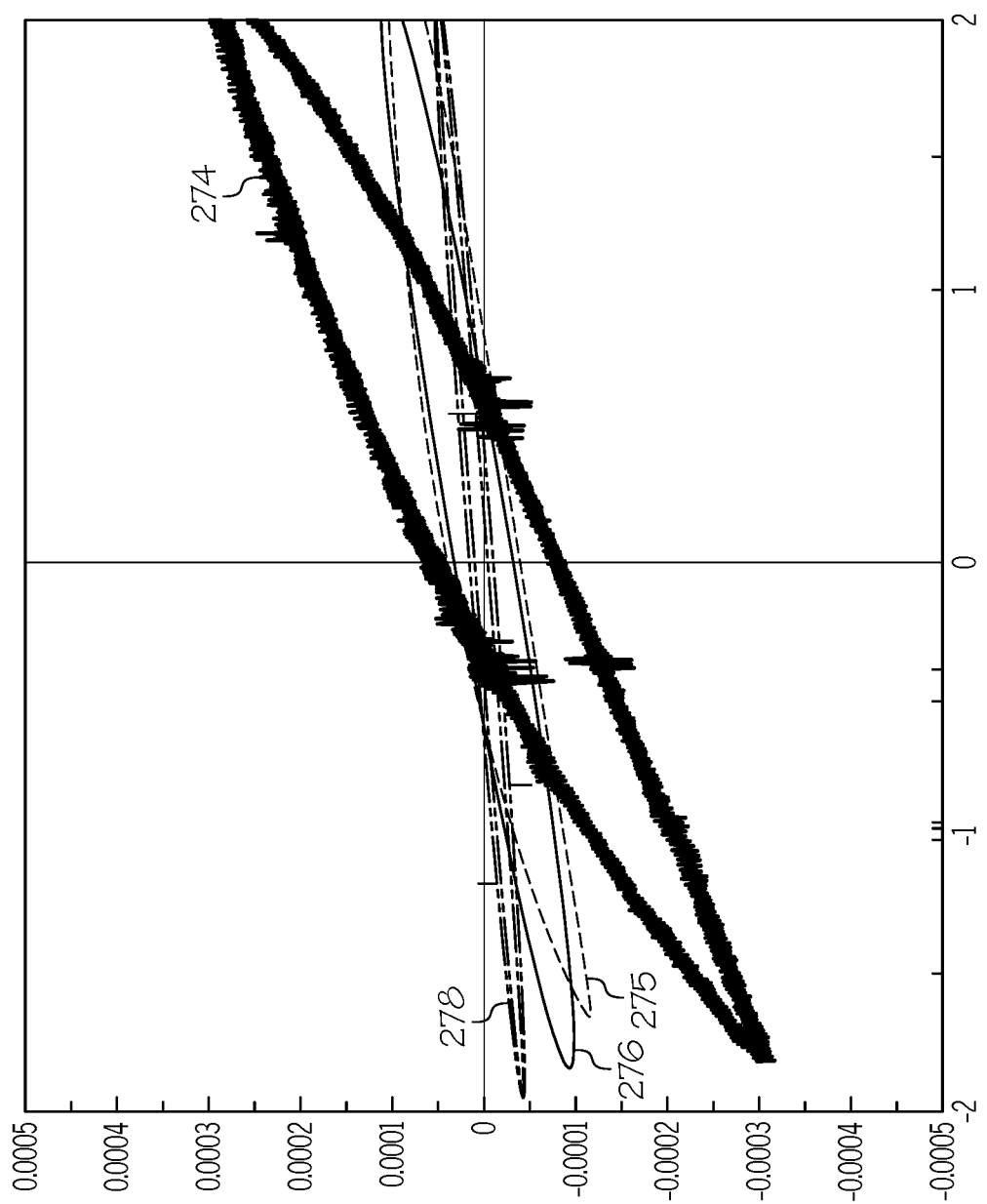
FIG. 7 is a graphical view illustrating an example current for the ceramic body of FIG. 3 measured at different temperatures at about 2 VDC.

FIG. 7 is a graphical view illustrating an example current for the ceramic body of FIG. 3 measured at different temperatures at about 2 VDC. The electric field may be applied between the cathode 271 and the anode 273 at elevated temperatures. In one example, the electric field is applied up to 2 VDC when the temperature of the ceramic body 229 of the forming device 143 is within a range of above about 500° C. up to about 1200° C. in order to accelerate the migration of mobile ions. As shown in FIG. 7, the current-voltage data measured for the ceramic body 229 at about 2 VDC supplied from the voltage power supply implies that the current measured for the ceramic body 229 may be noticeable when the temperature is equal to or greater than about 1000° C. A ceramic body 229 including a cuboid with a surface area of 2 cm$^2$ and a thickness of 1 cm may be used for the measurement. In this example, the horizontal axis of FIG. 7 represents the electric field applied across two electrodes in V, and the vertical axis represents current per unit electrode area in A/cm$^2$. As shown, at about 2 VDC supplied from the voltage power supply, the current 274 (about 0.3 mA/cm$^2$) measured at about 1000° C. is about three times greater than the currents 275, 276, 277 (about 0.1 mA/cm$^2$) measured at other temperatures ranging from about 700° C. to about 900° C. The hysteresis in each loop suggests that the mobile ions lag behind in following the applied voltage. In an example below about 1000° C., the contribution of the mobile ions to the current is minimal.

Figure 8:
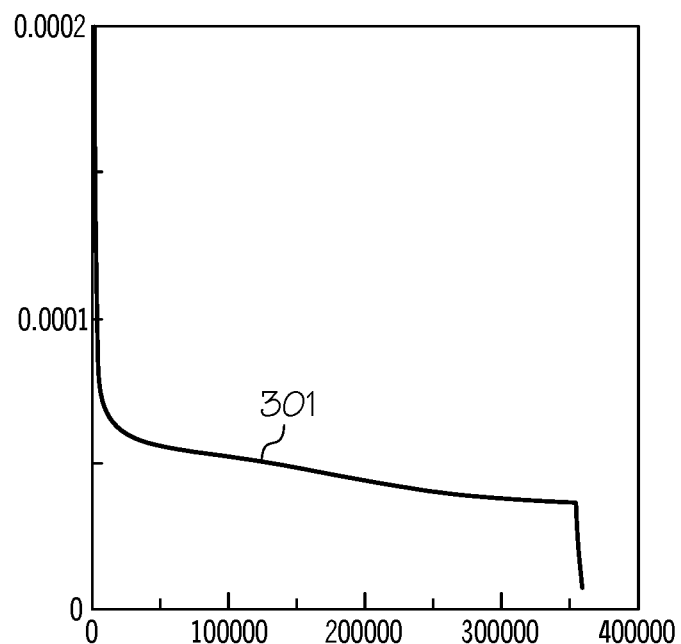
FIG. 8 is a graphical view illustrating an example of the current measured for the ceramic body as illustrated in FIG. 3 at about 1100° C. for about 100 hours at about 2 VDC.
Figure 9:
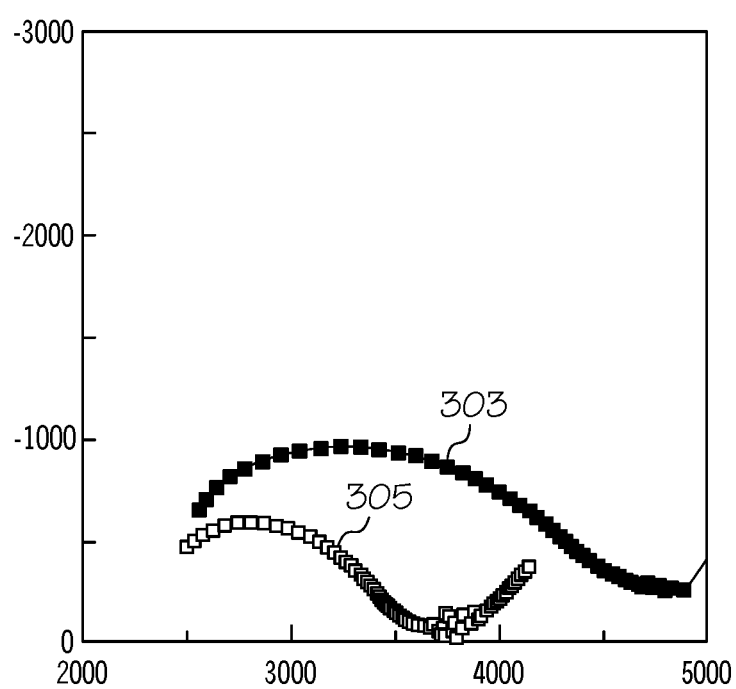
FIG. 9 is a graphical view illustrating an example of impedance measured for the ceramic body of FIG. 3 before and after a treatment for about 100 hours at about 1100° C. at about 2 VDC supplied from a voltage power supply.

FIG. 8 is a graphical view illustrating an example of current measured for the ceramic body 229 of FIG. 3 at about 1100° C. for about 100 hours at about 2 VDC supplied from the voltage power supply 277. In this view, the horizontal axis represents time (in seconds) at which the current across the ceramic body 229 is measured. The ceramic body 229 including a cuboid with a surface area of 2 cm$^2$ and a thickness of 1 cm was used for the measurement. The vertical axis represents the current per unit area (A/cm$^2$) measured during the treatment. As shown, the current 301 decreases with time until the current 301 is below about $5 \times 10^{-5}$ A/cm$^2$ at about 100 hours. The current measured may include the contribution of migrating ions in the ceramic body 229. Therefore, a decrease in the current level corresponding to time may be interpreted because of the ongoing depletion of ions or electrons in the ceramic body 229.

FIG. 7 is a graphical view illustrating an example current for the ceramic body of FIG. 3 measured at different temperatures at about 2 VDC. The electric field may be applied between the cathode 271 and the anode 273 at elevated temperatures. In one example, the electric field is applied up to 2 VDC when the temperature of the ceramic body 229 of the forming device 143 is within a range of above about 500° C. up to about 1200° C. in order to accelerate the migration of mobile ions. As shown in FIG. 7, the current-voltage data measured for the ceramic body 229 at about 2 VDC supplied from the voltage power supply implies that the current measured for the ceramic body 229 may be noticeable when the temperature is equal to or greater than about 1000° C. A ceramic body 229 including a cuboid with a surface area of 2 $cm^2$ and a thickness of 1 cm may be used for the measurement. In this example, the horizontal axis of FIG. 7 represents the electric field applied across two electrodes in V, and the vertical axis represents current per unit electrode area in $A/cm^2$. As shown, at about 2 VDC supplied from the voltage power supply, the current 274 (about 0.3 $mA/cm^2$) measured at about 1000° C. is about three times greater than the currents 275, 276, 278 (about 0.1 $mA/cm^2$) measured at other temperatures ranging from about 700° C. to about 900° C. The hysteresis in each loop suggests that the mobile ions lag behind in following the applied voltage. In an example below about 1000° C., the contribution of the mobile ions to the current is minimal.

Figure 10:
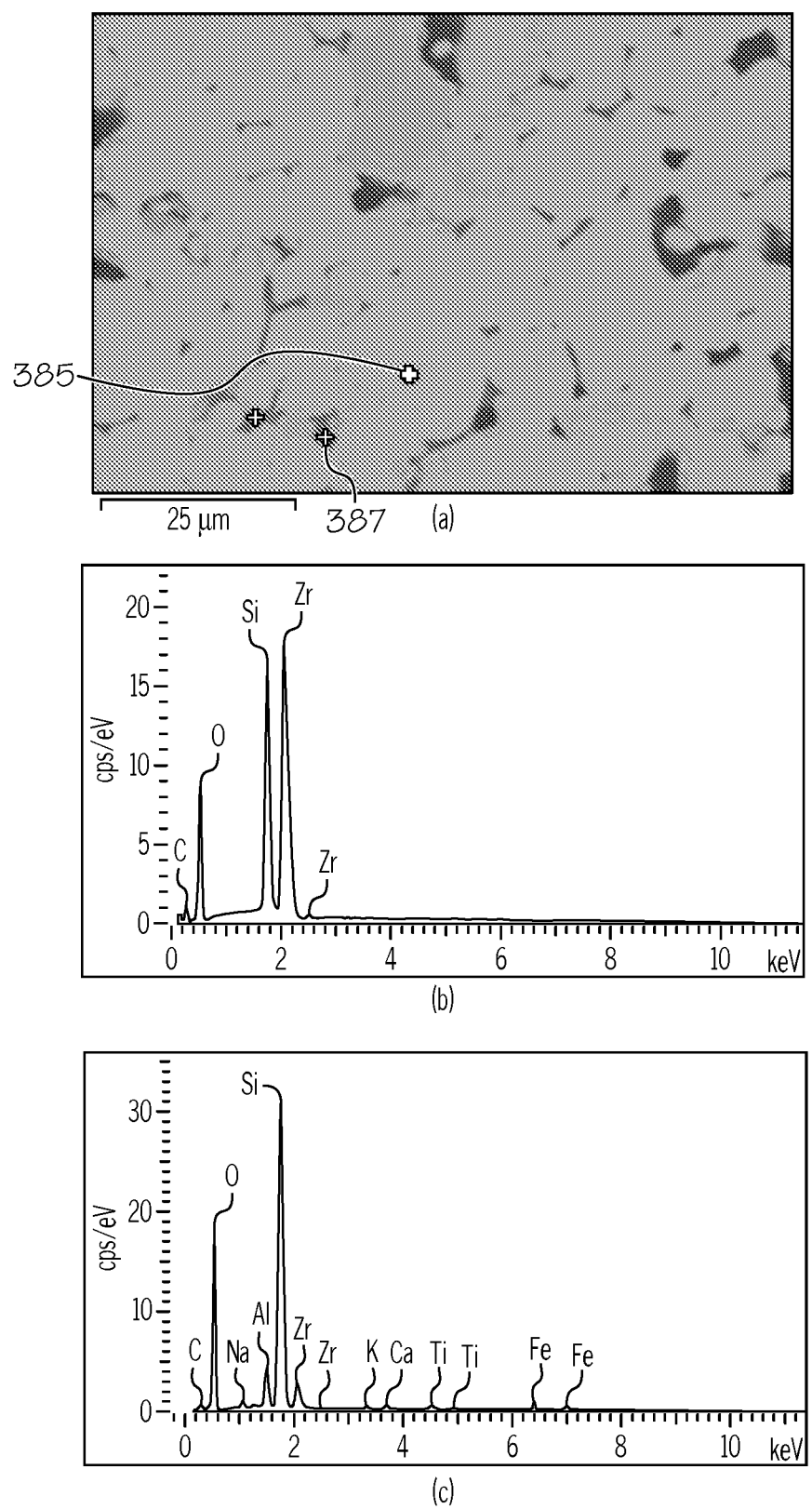
FIG. 10 illustrates an example of (a) a scanning electron micrograph (SEM) image of a ceramic phase and an intergranular glass phase (b) an energy dispersive spectroscopy (EDS) spectrum for the ceramic phase, and (c) an EDS spectrum for the intergranular glass phase of a ceramic body of an as-processed forming device including zircon that has not been treated with an electric field.

FIG. 10 illustrates an example of (a) a scanning electron micrograph (SEM) image of crystalline grains of the ceramic phase 385 and an intergranular glass phase 387, (b) an energy dispersive spectroscopy (EDS) spectrum for the crystalline grains of the ceramic phase 385, and (c) an EDS spectrum for the intergranular glass phase 387 of a ceramic body 229 of an as-processed forming device including zircon that has not been treated with an electric field. In this example, the ceramic body includes a ceramic phase 385 including zircon grains and an intergranular glass phase 387. The intergranular glass phase 387 may include at least one of alumino silicate glass, zirconia, sodium oxide, potassium oxide, calcium oxide, titanium oxide, iron oxide and other minor contributions. A fracture surface of the ceramic body 229 also illustrates that the intergranular glass phase 387 may be substantially interconnected throughout the ceramic body 229. According to the EDS spectrum taken for the crystalline phase of the ceramic phase 385 in FIG. 10(b), the presence of Zr, Si, and O, with negligible solid solution formation within zircon grains, is detected, which indicates that the crystalline grains of the ceramic phase 385 may include zircon. The EDS spectrum for the intergranular glass phase 387 shown in FIG. 10(c) indicates the presence of relatively high concentrations of mobile ions in comparison to the ceramic phase 385. The mobile ions include, but are not limited to, Na, K, Ca, Ti, and Fe ions. Carbon (C) peaks detected in the EDS spectra in FIGS. 10-14 can be from conductive material used for sample preparation for EDS analysis.

Figure 11:
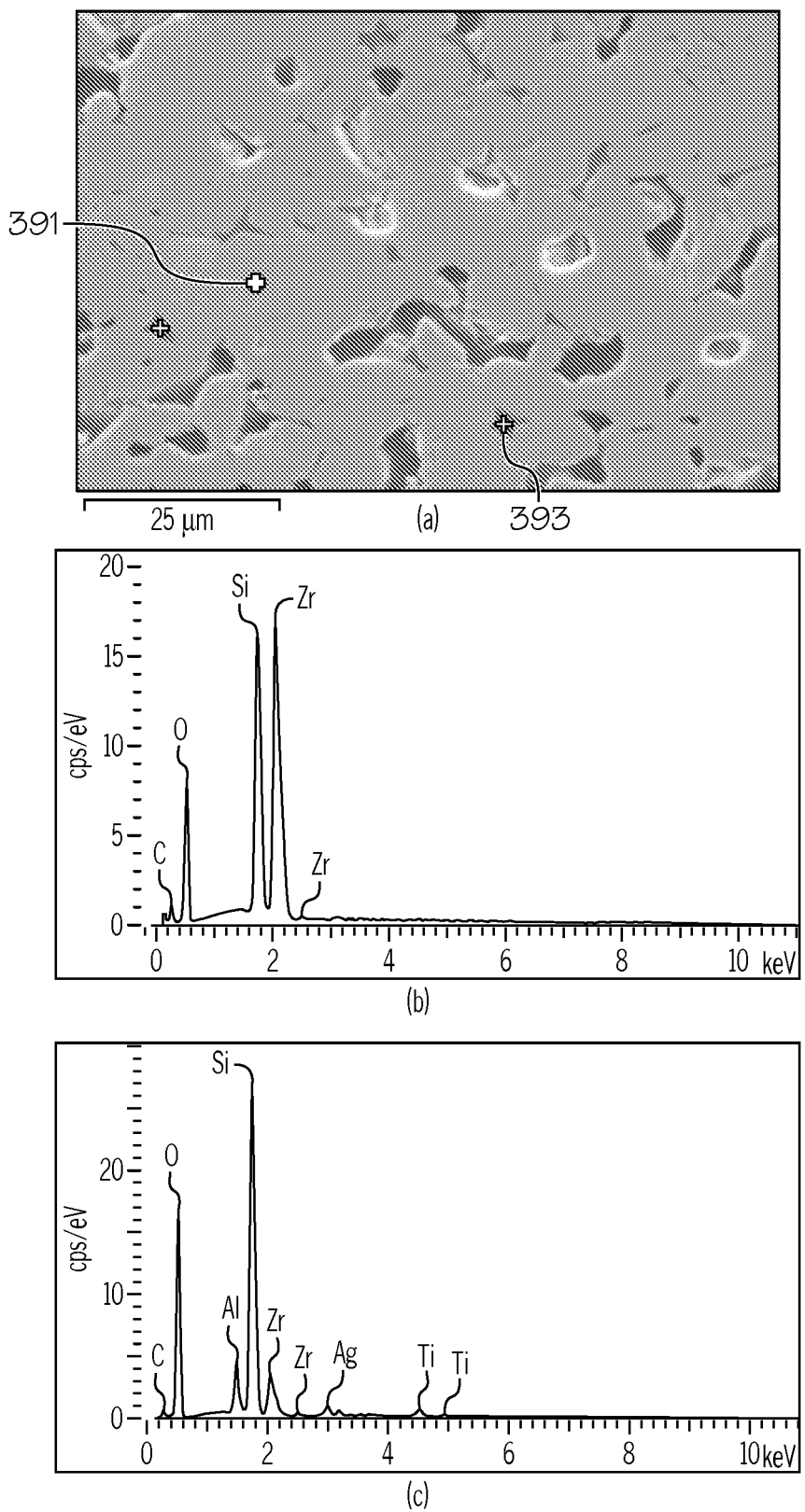
FIG. 11 illustrates an example of (a) an SEM image of a ceramic phase and an intergranular glass phase, (b) an EDS spectrum for the ceramic phase, and (c) an EDS spectrum for the intergranular glass phase in the "anode" side of the ceramic body treated at about 1100° C. for about 100 hours at about 2 VDC supplied from the voltage power supply.

FIG. 11 illustrates an example of (a) an SEM image of crystalline grains of the ceramic 391 and an intergranular glass phase 393, (b) an EDS spectrum for the crystalline grains of the ceramic phase 391, and (c) an EDS spectrum for the intergranular glass phase 393 at the "anode" side of the ceramic body 229 treated at about 1100° C. for about 100 hours at about 2 VDC supplied from the voltage power supply. The material microstructure and phase distribution are not significantly changed compared to the ceramic body 229 of FIG. 10(a). However, the chemical composition of the intergranular glass phase 393 after the treatment may have changed and be characterized by both the absence of sodium, potassium, calcium, and iron and a lower level of titanium. From FIG. 11(b), the EDS spectrum shows that the chemical composition of zircon grains 391, such as, but not limited to, zirconium silicate, does not exhibit any noticeable differences from that of the ceramic body 229 in FIG. 10(b). In an example, the EDS spectrum for the intergranular glass phase 393 in FIG. 11(c) detects only Ti as mobile ions. Al, Si, Zr are network formers of the intergranular glass phase 393 with relatively low ion mobility. The EDS spectra of FIG. 11 do not illustrate concentrations of any other mobile ions, as the concentrations thereof are too minute. Silver (Ag) detected in the EDS spectrum of FIG. 11(c) is an artifact from sample preparation.

Figure 12:
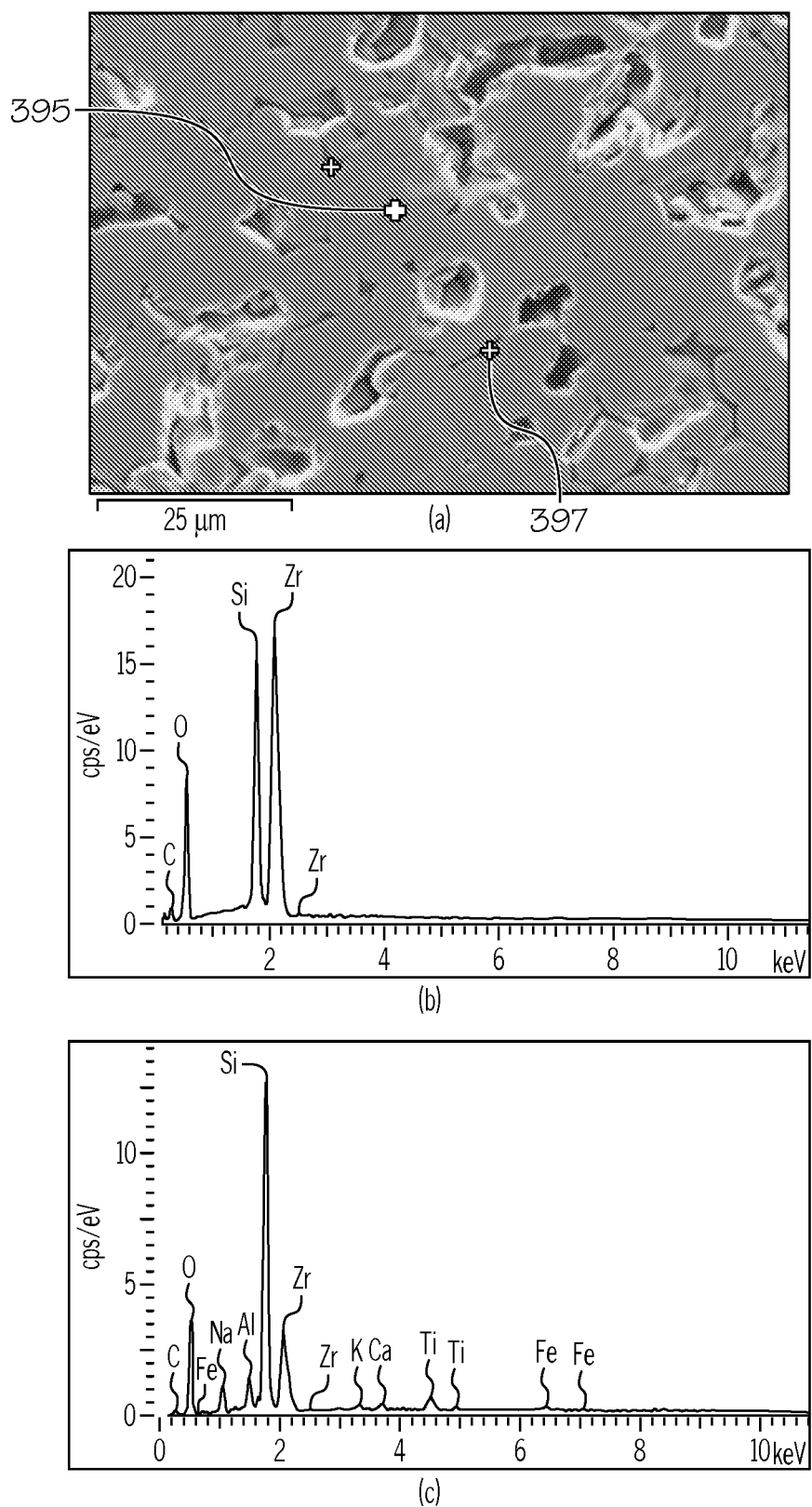
FIG. 12 illustrates an example of (a) an SEM image of a ceramic phase and an intergranular glass phase, (b) an EDS spectrum for the ceramic phase, and (c) an EDS spectrum for the intergranular glass phase in the "cathode side" of the ceramic body treated at about 1100° C. for about 100 hours at about 2 VDC supplied from the voltage power supply.

FIG. 12 illustrates an example of (a) an SEM image of crystalline grains of the ceramic phase 395 and an intergranular glass phase 397, (b) an EDS spectrum for the crystalline grains of the ceramic phase 395, and (c) an EDS spectrum for an intergranular glass phase 397 at the "cathode side" of the ceramic body 229 treated at about 1100° C. for about 100 hours at about 2 VDC supplied from the voltage power supply. The microstructure illustrated in FIG. 12(a) may not be significantly different from those illustrated in FIGS. 10(a) and 11(a) with respect to phase distribution and grain size. However, the EDS spectrum for the intergranular glass phase 397 in FIG. 12(c) illustrates the presence of a substantial amount of mobile ions in a proximity of the cathode. For example, the mobile ion concentrations of Na, K, Ca, Fe, and Ti measured for the intergranular glass phase 397 are significantly greater than the mobile ion concentrations in the intergranular glass phase 387 of the ceramic body 229 illustrated in FIG. 10(c).

Figure 13:
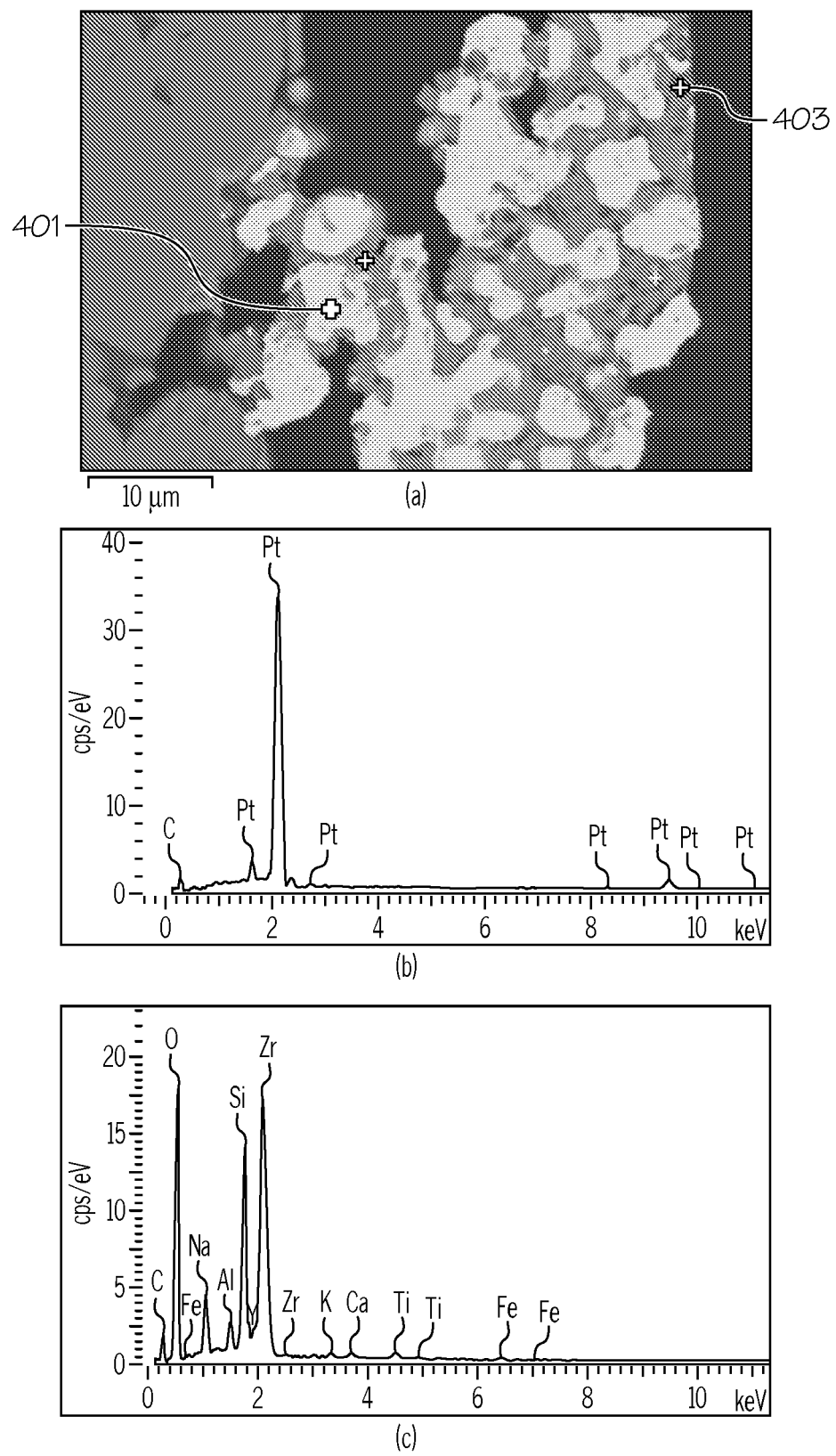
FIG. 13 illustrates an example of (a) an SEM image of a Pt/3YSZ cathode and EDS spectra for (b) Pt grains and (c) 3YSZ grains of the Pt/3YSZ cathode after about 100 hours at about 20 VDC at about 1100° C.

FIG. 13 illustrates an example of (a) an SEM image of a Pt/3YSZ cathode and EDS spectra for (b) Pt grains 401 and (c) 3YSZ grains 403 of a Pt/3YSZ cathode after about 100 hours at about 20 VDC at about 1100° C. With respect to the Pt/3YSZ cathode, Pt grains 401 and 3YSZ grains 403, which include porous zirconia grains, are uniformly interconnected with each other as shown in FIG. 13(a). The effective peaks in the EDS spectrum illustrated in FIG. 13(b) show the presence of Pt only. Pt grains 401 in the Pt/3YSZ cathode are physically or chemically inert and may not react with other materials, such as, but not limited to, zirconium, silicon, and aluminum. On the other hand, the EDS spectrum in FIG. 13(c) shows that a high concentration level of mobile ions was detected in the 3YSZ grains 403, thereby suggesting that either the fine pores or the grain boundaries of the 3YSZ grains 403 was enriched with mobile ions. The mobile ions may be captured and/or bonded by the porous zirconia grains due to a relatively loose microstructure of the 3YSZ grains 403, which has a high porosity, a correspondingly high specific surface area, and a small grain size.

Figure 14:
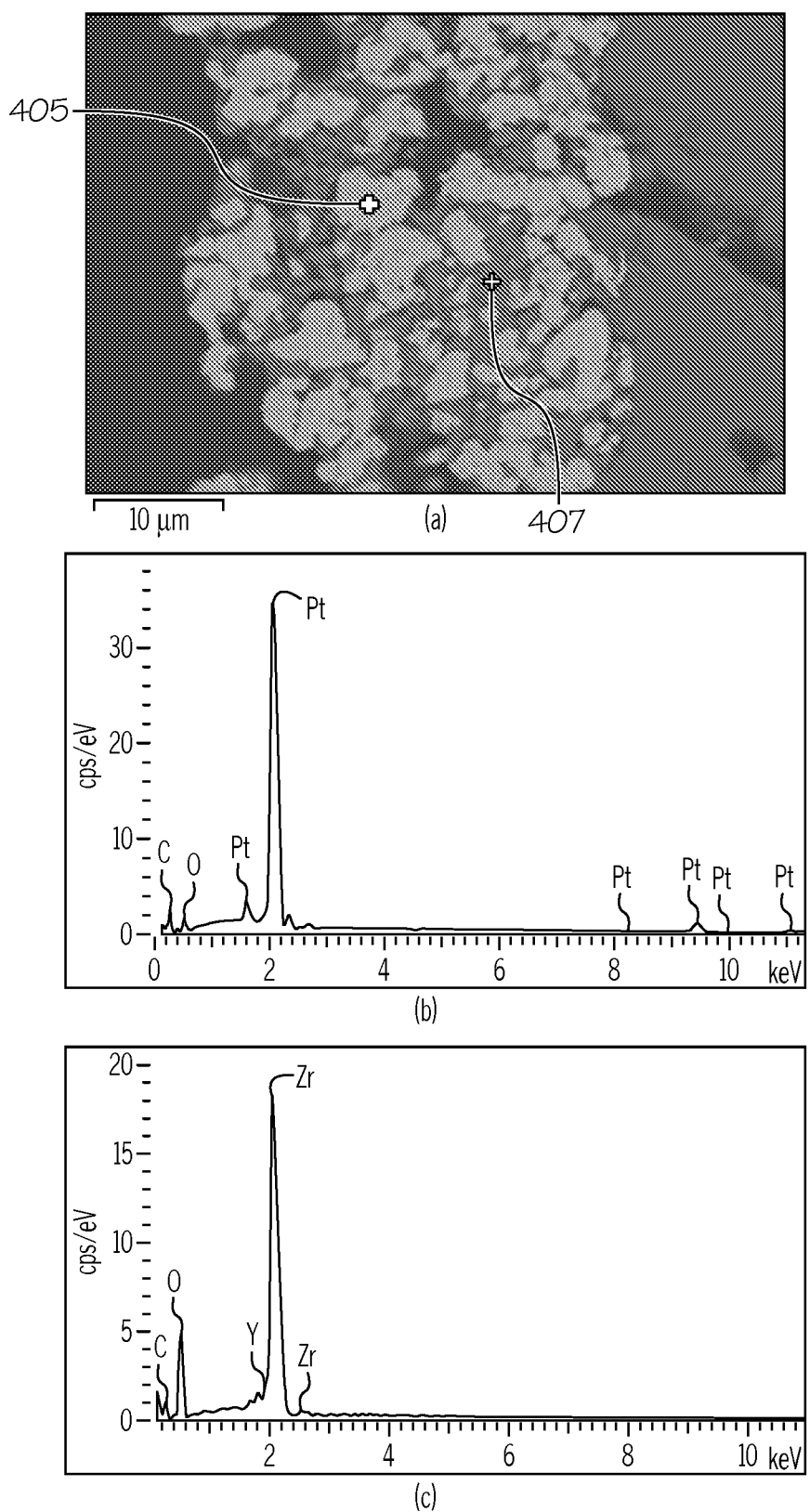
FIG. 14 illustrates an example of (a) an SEM image of a Pt/3YSZ anode and EDS spectra for (b) Pt grains and (c) 3YSZ grains of the Pt/3YSZ anode after about 100 hours at about 20 VDC at about 1100° C.

FIG. 14 illustrates an example of (a) an SEM image of a Pt/3YSZ anode and EDS spectra for (b) Pt grains 405 and (c) 3YSZ grains 407 of the Pt/3YSZ anode after about 100 hours at about 20 VDC at about 1100° C. In this example, unlike the Pt/3YSZ cathode in FIG. 13(c), only Y and Zr are detected in the EDS spectrum measured for zirconia grains 407. Other mobile ions are either not detected or in quantities that are not within the detection capability of EDS analysis. This result is consistent with FIG. 11(c) and corroborates previous findings demonstrating that substantially all of the mobile ions may migrate toward the cathode and may be depleted from the ceramic body 229 proximate the anode.

Figure 15:
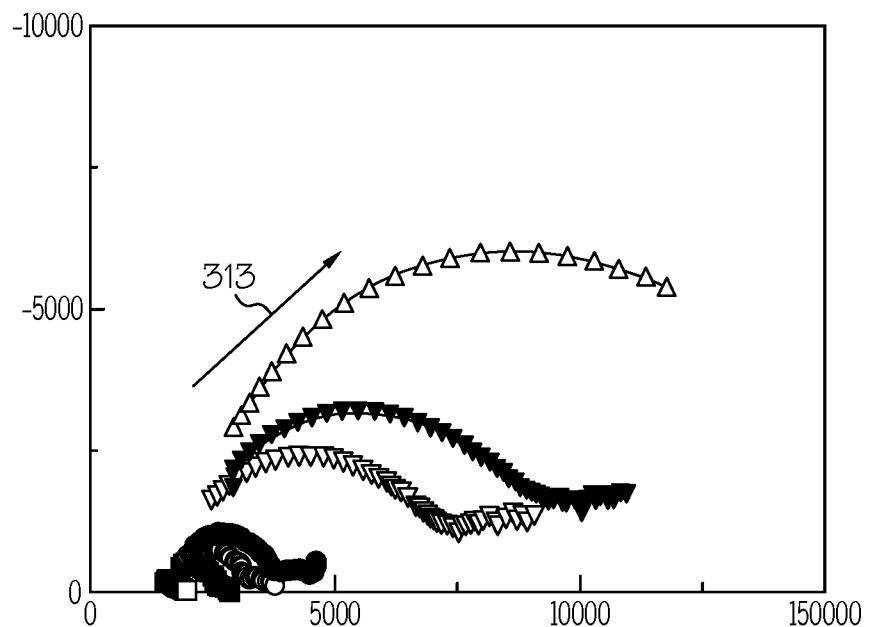
FIG. 15 is a graphical view illustrating an example of the impedance for the ceramic body of the forming device made of zircon of FIG. 2 when measured at different periods ranging up to about 33 hours at about 1200° C. at about 2 VDC supplied from the voltage power supply.

FIG. 15 is a graphical view illustrating an example of the impedance for the ceramic body 229 of the forming device 143 of FIG. 2 when measured at different treatment periods ranging up to about 33 hours at about 1200° C. at about 2 VDC supplied by the voltage power supply 277. Pt/3YSZ electrodes may be applied on opposite surfaces of the ceramic body 229. Pt wires may be used as lead wires connecting the Pt/3YSZ electrodes and the voltage power supply 277. As such, the horizontal axis of FIG. 15 represents the real part of impedance in ohms, and the vertical axis represents the imaginary part of impedance in ohms. The main arc of the impedance corresponds to the ion migration in the device and increases in the direction of the arrow 313 during the periods of measurement. The increase in the impedance arc corresponding with an increase in duration of the treatment period may be related to the ion migration in the ceramic body 229, which may further be interpreted as the increase in the resistance of the ceramic body 229 corresponding with the increase in duration of the treatment period. Table 2 shows the voltage applied across opposite surfaces of the ceramic body 229 for which the impedance is shown in FIG. 15, which is calculated based on measurements of resistance and current at about 1200° C.

TABLE 2

Resistance, current and voltage applied across the ceramic body measured at about 1200° C. at about 2 VDC

| Time (hours) | Resistance of zircon (ohms) | Current (A) | Voltage across zircon (V) |
|---|---|---|---|
| 0 | 430 | 0.4 | 0.17 |
| 1 | 1010 | 0.178 | 0.18 |
| 2 | 1662 | 0.135 | 0.22 |
| 3 | 2366 | 0.117 | 0.28 |
| 13 | 6145 | 0.074 | 0.45 |
| 17.5 | 9087 | 0.069 | 0.63 |
| 33 | 13694 | 0.057 | 0.78 |

According to Table 2, the resistance of the ceramic body 229 increases by almost about two orders of magnitude during period durations ranging up to about 33 hours. For the specific configuration of the ceramic body 229 measured, the resistivity increases from about 1,720 ohm·cm at the onset of the measurement to about 54,776 ohm·cm at 33 hours. On the other hand, the current decreases by about one order of magnitude during the same respective period durations. The voltage across the ceramic body 229, calculated by multiplying the resistance and the current at each period, increases from an initial voltage of 0.17 V to 0.78 V at about 33 hours. As shown in Table 2, the voltage applied across the ceramic body 229 is less than the electrolysis threshold of the zircon (about 1.89 V at about 1500 K, for example) as previously set forth above in Table 1. A portion of electric potential drop off may occur through Pt wire and/or at interfaces between the zircon ceramic body 229 and the Pt/3YSZ electrode.

Figure 16:
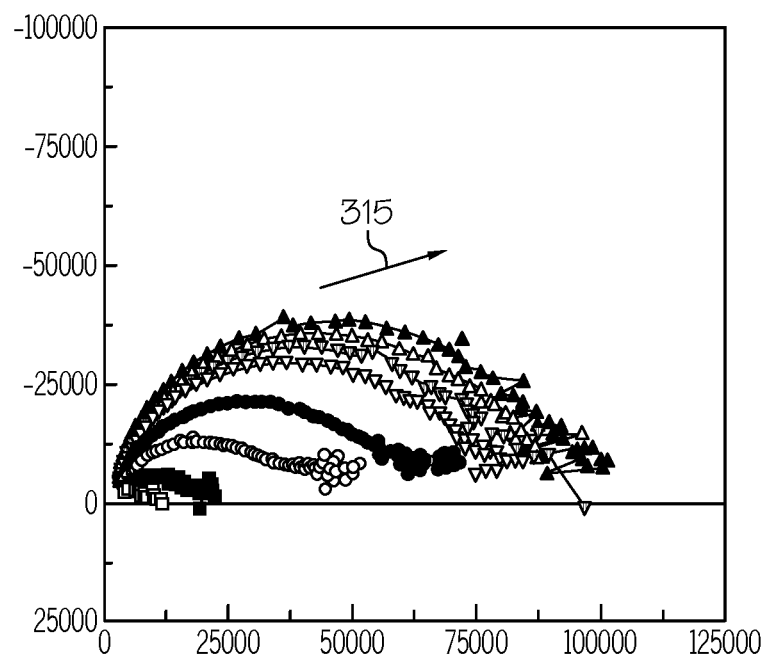
FIG. 16 is a graphical view illustrating an example of the impedance for the ceramic body of the forming device of FIG. 2, made of a zircon with a creep rate lower than the zircon in FIG. 15, measured at different periods ranging from 0 hours up to about 75 hours at about 1200° C. at about 8 VDC supplied from the voltage power supply.

FIG. 16 is a graphical view illustrating an example of impedance for ceramic body 229 of the forming device 143 corresponding with FIG. 2 and including low creep zircon (LCZ) measured at different periods ranging from 0 hours up to about 75 hours at about 1200° C. at about 8 VDC supplied from the voltage power supply. Pt/3YSZ electrodes may be formed on both sides of the ceramic body 229 for acquiring electrical data. The horizontal axis of FIG. 16 represents the real part of impedance in ohms, while the vertical axis represents the imaginary part of impedance in ohms. The impedance may increase as the treatment duration increases in the arrow direction 315 up to about 75 hours, which is consistent with previous impedance measurements for the ceramic body 229 including zircon in FIG. 15.

The resistance data may also be measured for the ceramic body 229 including LCZ at about 8 VDC supplied from the voltage power supply 277. The resistance may increase during the treatment from about 6800 ohms, which corresponds to the resistivity of about 13,660 ohm·cm, at a beginning of the treatment to about 90,500 ohms, which corresponds to the resistivity of about 181,000 ohm·cm at about 75 hours, which is consistent with the increase in impedance as shown in FIG. 16.

While an electric potential difference that is less than the electrolysis threshold can be applied across the two surfaces of the ceramic body 229 for demixing, an electric potential difference that is greater than the electrolysis threshold can also be applied across the two surfaces of the ceramic body 229 to migrate mobile ions. Table 3 shows a resistance and a corresponding current measured for the ceramic body 229 at about 1200° C. for a period ranging up to about 50 hours at about 12 VDC supplied from the voltage power supply 277. Pt/3YSZ electrodes are formed on the two surfaces of the ceramic body 229 and heat treated at a predetermined temperature.

TABLE 3

Resistance, current, and voltage applied across the ceramic body 229 measured at about 1200° C. at about 12 VDC for a period ranging up to about 50 hours

| Time (hours) | Resistance of zircon (ohms) | Current (A) | Voltage across zircon (V) |
|---|---|---|---|
| 5 | 92,916 | $7.00 \times 10^{-5}$ | 6.5 |
| 10 | 112,000 | $5.30 \times 10^{-5}$ | 5.94 |
| 20 | 127,000 | $5.00 \times 10^{-5}$ | 6.35 |
| 50 | 160,000 | $4.60 \times 10^{-5}$ | 7.36 |

As shown, the resistance of the ceramic body 229 increases and the current of the ceramic body 229 decreases with an increase in duration of a treatment while 12 VDC is applied to the ceramic body 229. Similar to Table 2, the voltage across the ceramic body 229 is calculated by multiplying a measured resistance of zircon with a measured current. Regardless of the duration of the treatment, the measured voltages across the ceramic body 229 range between about 5.94 V and about 7.36 V, which are greater than the electrolysis threshold (about −1.89 V at about 1500 K, for example) for the ceramic body 229 including zircon as shown in Table 1.

As described above, when the electric potential difference is greater than the electrolysis threshold, electrolysis may occur in addition to demixing. In an example including an oxide system, electrolysis causes phase decomposition of the ceramic body 229 under a release of oxygen gas at the anode 273. Oxygen gas formation at the anode 273 may facilitate the formation of a plurality of tiny pores at the surface proximate the anode 273, which will eventually result in incomplete contact at the interface between the anode 273 and the surface proximate the anode 273. As a result, an electric field generated from the voltage power supply 277 may not be fully applied across the cathode 271 and the anode 273, which may inhibit demixing and corresponding migration of mobile ions toward the cathode 271. Therefore, to inhibit electrolysis, the electric field applied to the ceramic body 229 can be controlled to where the electric potential difference is below the electrolysis threshold of the materials composing the ceramic body 229.

Figure 17:
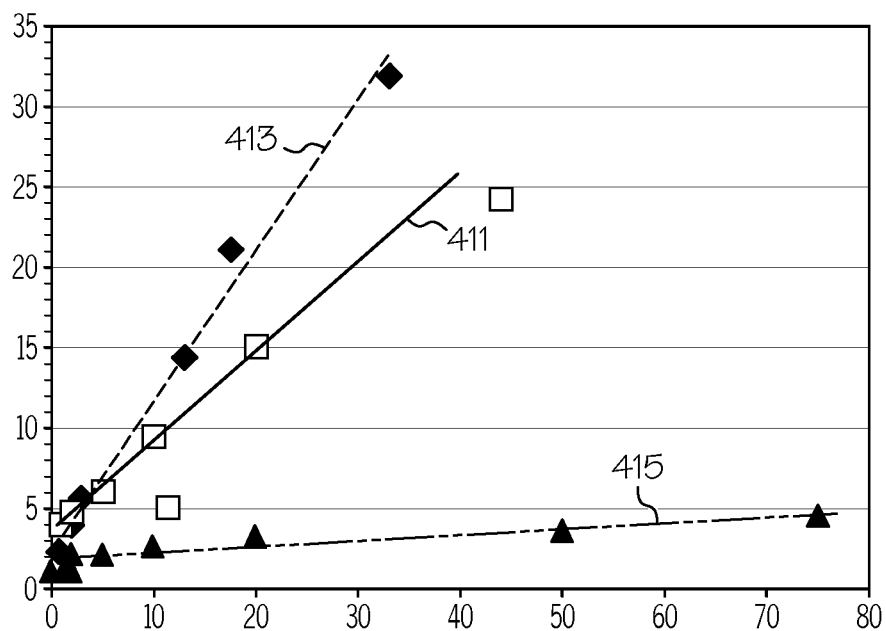
FIG. 17 is a graphical view illustrating an example of relative resistivity for the ceramic body of the forming device of FIG. 2 after treatments at different temperatures and different electric fields.

FIG. 17 is a graphical view illustrating an example of relative resistivity for the ceramic body 229 of the forming device 143 of FIG. 2 after treatment at different temperatures and different electric fields. The horizontal axis of FIG. 17 represents the period in hours, while the vertical axis represents relative resistivity in R/RO, where R is the resistivity measured at different periods of duration under different electric fields and temperatures, and RO is the resistivity of an as-processed forming device. Changes in slope of R/RO with respect to period may indicate how the resistivity of the ceramic body 229 may change with duration of the period. In one example, a relatively steep slope for R/RO at a particular period duration may indicate a resistivity of the ceramic body 229 that changes at a faster rate with the particular period duration. In another example, relatively low slope for R/RO at a particular period duration may indicate a resistivity of the ceramic body 229 that changes at a lower rate with the particular period duration.

The relative resistivities 411 and 413, measured for ceramic bodies treated at 1100° C. and 1200° C. respectively under −2 VDC, may show relatively steep slopes, even beyond period durations of 30 hours, which may indicate that the treatment of the ceramic body 229 at elevated temperatures under the electric field applied to the ceramic body 229, in which the electric potential difference is controlled to be below the electrolysis threshold, may be advantageous in increasing the resistance of the ceramic body 229. The slope of the relative resistivity 413 may be greater than the slope of the relative resistivity 411, which may indicate that, within the temperature range used, higher treatment temperatures may be effective in further migrating the mobile ions to increase the resistivity of the ceramic body 229. On the other hand, the relative resistivity 415, measured for the ceramic body 229 treated at 1200° C. and 12 VDC up to about 75 hours in duration demonstrated a relatively low slope compared to those illustrated with respect to the relative resistivities of 411 and 413. 12 VDC, supplied from the voltage power supply 277, may still generate an electric field in which the electric potential difference is high enough to exceed the electrolysis threshold as described above. As such, the relatively low slope measured from a treatment under 12 VDC may imply that an electric field generating an electric potential difference that is greater than the electrolysis threshold may not be efficient in increasing the resistance of the ceramic body 229 in comparison with a treatment under an electric field generating an electric potential difference that is less than the electrolysis threshold.

Figure 18:
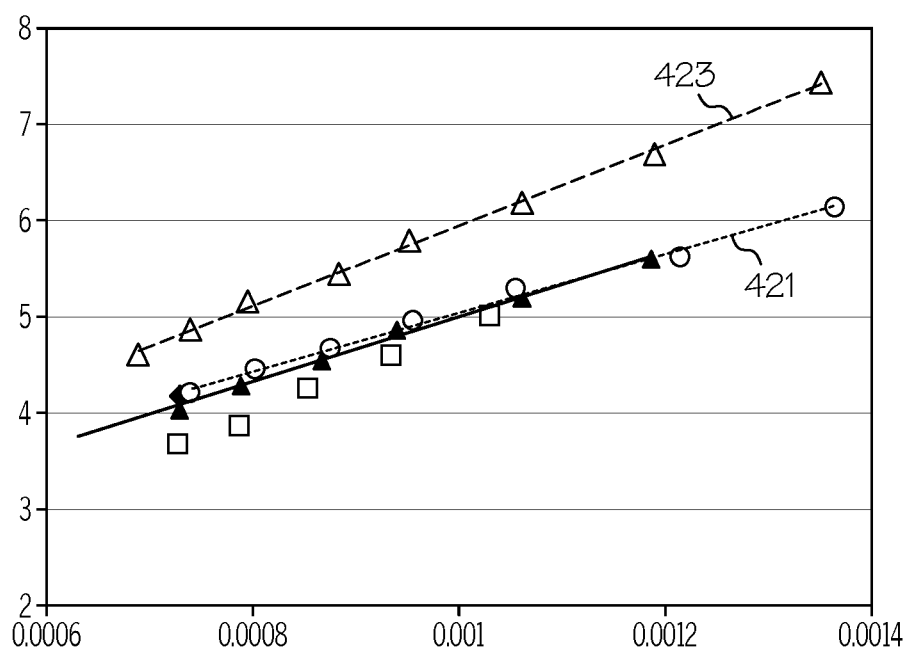
FIG. 18 is a graphical view illustrating an example of resistivity for the ceramic body of the forming device of FIG. 2 measured at different temperatures before and after treatments applied under 2 VDC supplied from the voltage power supply.

FIG. 18 is a graphical view illustrating an example of resistivity for the ceramic body 229 of the forming device 143 of FIG. 2 measured at different temperatures before and after treatments applied under 2 VDC supplied from the voltage power supply 277. The forming device 143 may be made of zircon. The horizontal axis of FIG. 18 represents the inverse temperature in $K^{-1}$, while the vertical axis represents the resistivity of the forming device in log Resistance. The resistivity 421 represents the change in the resistivity of an as-processed forming device, while the resistivity 423 represents the change in the resistivity measured for the ceramic body 229 proximate the anode that underwent treatment under 2 VDC. As shown, the resistivity 423 is greater than the resistivity 421 by almost one order of magnitude spanning the range of the period duration. As such, the treatment may be expected to provide the ceramic body 229 with an improved resistance by driving the mobile ions from the ceramic body 229.

Figure 19:
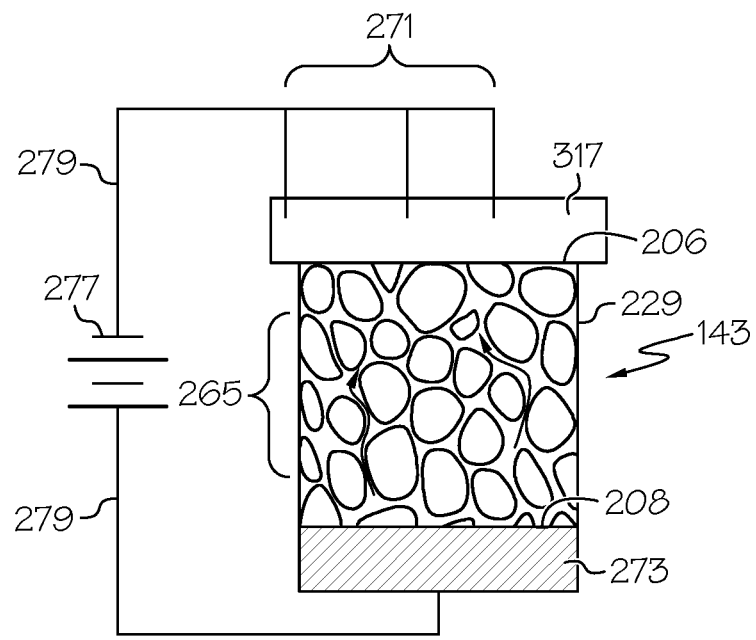
FIG. 19 is a schematic view illustrating an example of an in-situ treatment arrangement of the ceramic body of the forming device of FIG. 2.

FIG. 19 is a schematic view illustrating an example of an in-situ treatment arrangement of the ceramic body 229 of the forming device 143 of FIG. 2. According to FIG. 19, one or more cathodes 271 may be immersed in a glass melt 317 and coupled to the voltage power supply 277 by the lead wire 279. The anode 273 may be coupled to the outer surface 208 of the ceramic body 229 and the voltage power supply 277 by the lead wire 279. In one example, the cathodes 271 are in contact with or immersed in the glass melt 317 without contacting the inner surface 206 of the ceramic body 229. In another example, cathodes 271 are inserted to contact the inner surface 206 of the ceramic body 229.

The interface area between the glass melt 317 and the inner surface 206 of ceramic body 229 can be a diffusion cross section by using the example cathode 271 configuration as shown in FIG. 19. In one example, the cathodes 271 include a plurality of conducting wires or probes. As the glass melt 317 may be an electrically conducting medium at elevated temperature, the cathodes 271, immersed in the glass melt 317, may apply an electric field to the glass melt 317 such that the electric field generated from the cathodes 271 is applied across the entire interface area between the glass melt 317 and the inner surface 206. This may be advantageous as the mobile ions would migrate across the maximum interface area between the glass melt 317 and the inner surface 206. The example shown in FIG. 19 may be used to force migration of mobile ions out of the ceramic body 229 and into the glass melt 317 during or prior to the manufacturing of glass. In an example, either impurity ions that present at the inner surface 206 of the ceramic body 229 or residues from a previously manufactured glass melt that is solidified on the inner surface 206 of the ceramic body 229 are removed by providing the pure glass melt 317 multiple times while the electric field is applied between the cathode 271 and the anode 273 to force migration of impurity ions from the ceramic body 229 and into the glass melt 317. Promptly forcing migration of impurity ions from the previously manufactured glass melt and/or the inner surface 206 of the ceramic body 229 may reduce the need for extended periods of forced migration.

For example, when the electric field is applied between the cathode 271 and the anode 273, mobile ions enriched in the interior 265 of the ceramic body 229 may acquire enough driving force to migrate to the inner surface 206 proximate the cathode 271 across the inner surface 206 of the ceramic body 229 into the glass melt 317. As such, the concentration of mobile ions in the interior 265 of the ceramic body 229 (and proximate the inner surface 206) may decrease while the concentration of mobile ions in the glass melt 317 may increase. Subsequently, a glass melt 317 having a high mobile ion concentration may be flushed out of the ceramic body 229 and, after a predetermined period, replaced by a glass melt 317 having no impurities. By repeatedly being forced to migrate, the mobile ions may be depleted from the interior 265 of the ceramic body 229 toward the inner surface 206. As a result, the concentration of mobile ions proximate the inner surface 206 of the ceramic body 229 may be reduced below a threshold, at which time the forced migration of the mobile ions would cease and the drawing of glass may begin, thereby inhibiting the contact of mobile ions from the forming device 143 with the glass melt 317 that is in contact with the inner surface 206 of the ceramic body 229.

Figure 20:
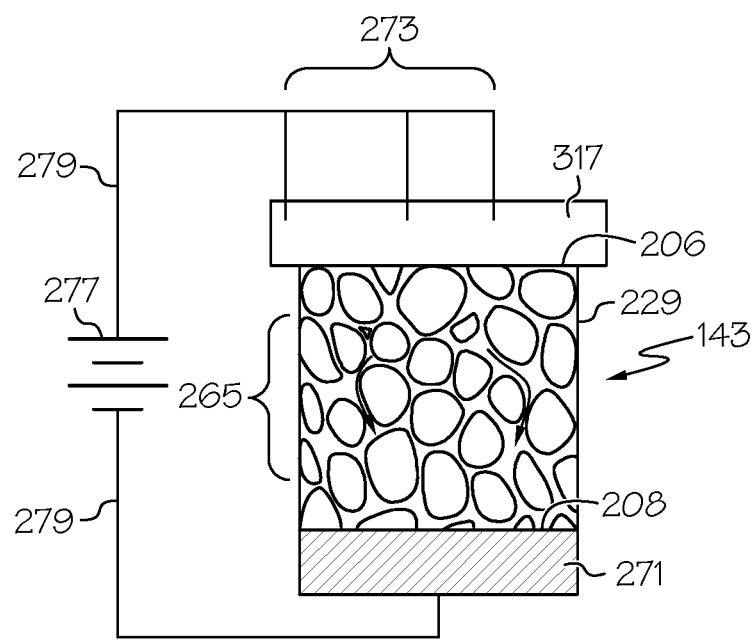
FIG. 20 is a schematic view illustrating another example of the in-situ treatment arrangement of FIG. 19 for the ceramic body of the forming device of FIG. 2.

FIG. 20 is a schematic view illustrating another example of the in-situ treatment arrangement for the ceramic body 229 of the forming device 143. In this arrangement, the cathode 271 is coupled to the outer surface 208 of the ceramic body 229 and the anode 273 is immersed in glass melt 317. Alternatively, the anode 273 can be in contact with the inner surface 206 that is in contact with the glass melt 317. When the electric field is applied between the cathode 271 and the anode 273, mobile ions may be pulled toward the interior 265 of the ceramic body 229, leaving the inner surface 206 depleted of mobile ions. As a result, the depletion of mobile ions at the inner surface 206 may inhibit mobile ions from contacting the glass melt 317 that is in continuous contact with the inner surface 206.

As set forth above, the forming device 143 may be treated without being displaced from the glass manufacturing apparatus 101 by using the example arrangements of the cathode 271 and the anode 273 illustrated in FIGS. 19 and 20. In addition to flushing, glass sheets/ribbons may be drawn while the example arrangements illustrated in FIGS. 19 and 20 are operational. In one example, the impurity concentration of the glass sheets/ribbons from the forming device 143 is monitored such that, if the impurity concentration is above a threshold level, the glass sheets/ribbons can be drawn while the arrangement shown in FIGS. 19 and 20 treats the forming device 143.

Figure 21:
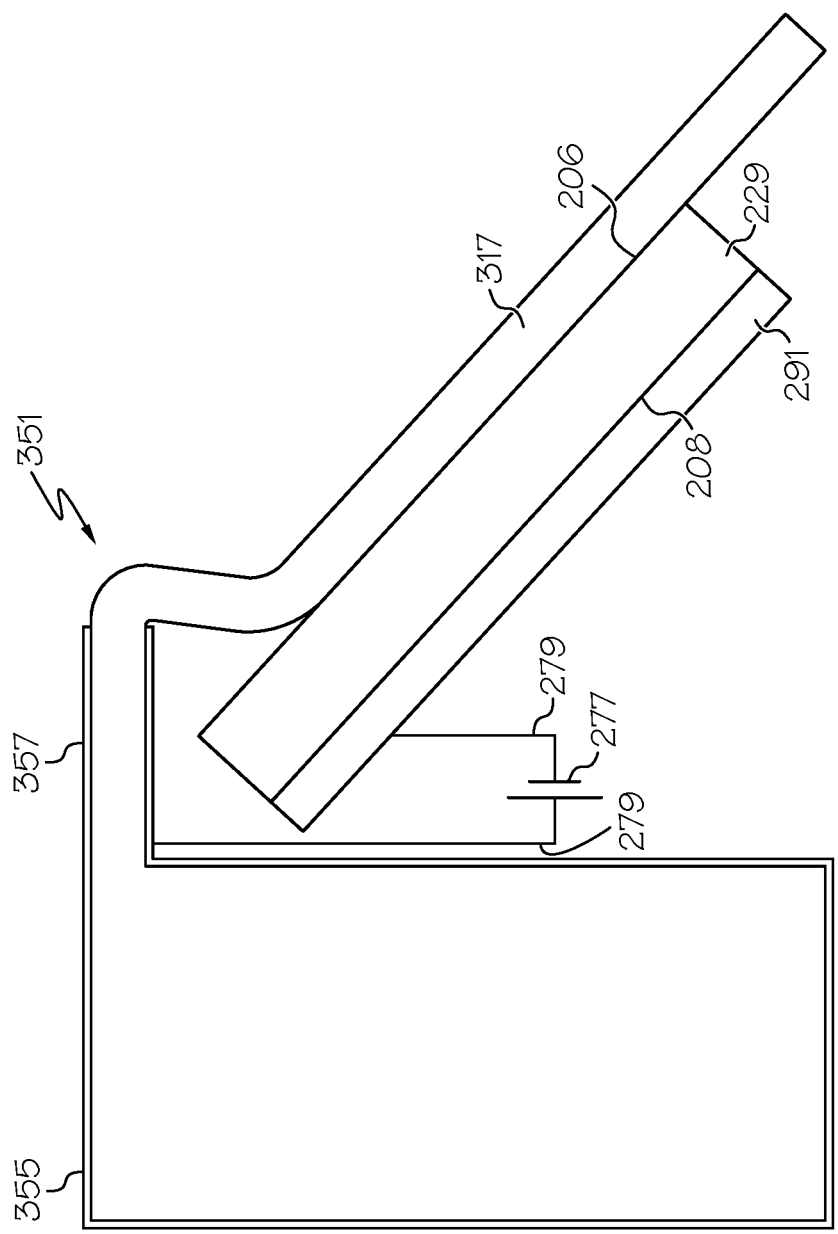
FIG. 21 is a schematic view illustrating yet another example of an in-situ treatment arrangement for the ceramic body of the forming device of FIG. 2.

FIG. 21 is a schematic view illustrating yet another example of an in-situ treatment arrangement for the ceramic body 229 of the forming device 143 of FIG. 2. The arrangement 351 shown in FIG. 21 may include a zirconia-inclusive ceramic body 229 that is positioned about 45° to the vertical axis for receiving the glass melt 317 supplied from the platinum reservoir 355, which includes platinum (Pt) as a cathode. The platinum reservoir 355 may include an inlet 357 configured to provide the glass melt 317 in a direction toward the ceramic body 229. As the glass melt 317 is electrically conductive and forms a continuous melt ribbon between the platinum reservoir 355 and a surface of the ceramic body 229, negative electric potential may be applied to the glass melt 317 by applying negative electric potential to the platinum reservoir 355.

One or more portions of the outer surface 208 of the ceramic body 229 may include a Pt/3YSZ-including storage electrode 291 as an anode. Two lead wires 279 may be electrically coupled to the platinum reservoir 355 and the storage electrode 291, respectively. The lead wires 279 may include platinum (Pt) wire. The lead wires 279 may also be connected to the voltage power supply 277 to provide a controlled VDC across the platinum reservoir 355 and the storage electrode 291.

The glass melt 317 in the platinum reservoir 355 may be provided to the inner surface 206 of the ceramic body 229 by continuously feeding the platinum reservoir 355 holding the glass melt 317. The treatment in FIG. 21 may include the application of different electric fields with different polarities across the ceramic body 229. Polarities of electrodes may be switched from the positive to the negative, or vice versa, in order to drive mobile ions out of the ceramic body 229 into the melt and inhibit the enrichment of mobile ions in a vicinity of the inner surface 206 of the ceramic body 229.

In one example, +3 VDC is applied between the platinum reservoir 355 and the storage electrode 291 for about one hour. Subsequently, the electric field generated is increased up to +6 VDC for about 5 minutes. Then, the electric field generated is further increased up to +10 VDC for about 45 minutes to further expedite the migration of mobile ions toward the cathode provided by the platinum reservoir 355. The polarities of electrodes are then reversed such that −1 VDC is applied between the platinum reservoir 355 and the storage electrode 291 to force migration of any mobile ions near the inner surface 206 toward the interior 265 of the ceramic body 229, thereby serving to substantially deplete of the inner surface 206 of mobile ions enriched thereon. An actual electric field applied across the inner surface 206 and the outer surface 208 may be less than the electric field generated from the voltage power supply 277 due to an extended length of the lead wires 279 as well as potential drops at interfaces between the ceramic body 229 and the storage electrode 291, and the storage electrode 291 and the lead wire 279.

In another example, electric fields with one or more predetermined magnitudes are generated and applied to the platinum reservoir 355 and the storage electrode 291 for predetermined durations to drive the mobile ions into the glass melt. Then, the polarities of the platinum reservoir 355 and the storage electrode 291 are inverted to deplete the mobile ions from the inner surface 206 as long as electrolysis of the ceramic body 229 does not occur. Inverting the polarities of electrodes may be repeated according to the needs of the particular operation.

Figure 22:
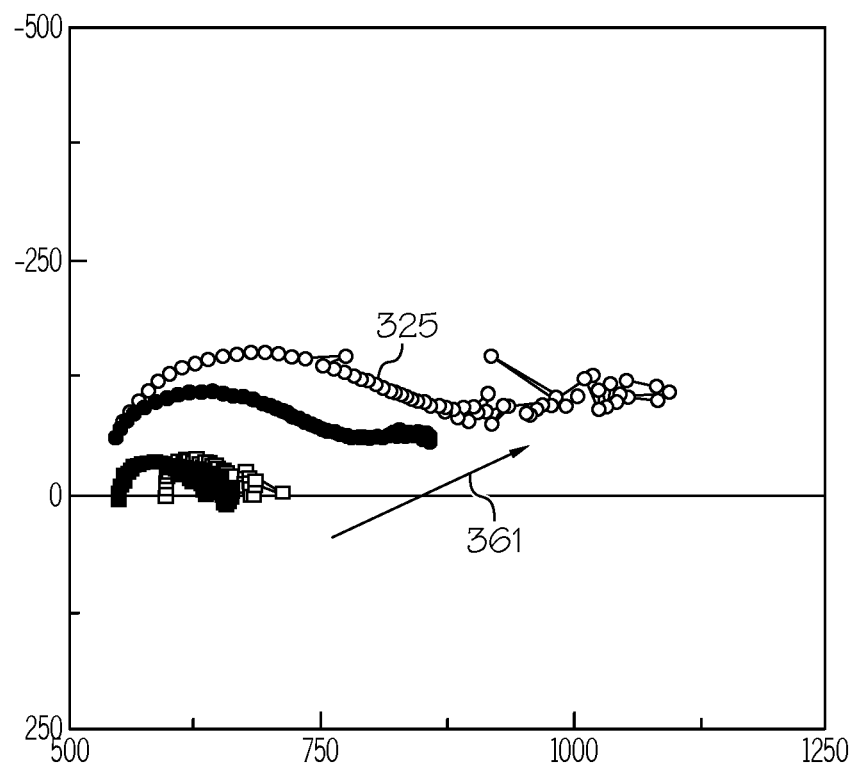
FIG. 22 is a graphical view illustrating an example of the impedance measured for the ceramic body of the forming device of FIG. 2 treated with the arrangement illustrated in FIG. 21 at about 1240° C. at about 3 VDC supplied from the voltage power supply during treatment.

FIG. 22 is a graphical view illustrating an example of the impedance measured for the ceramic body 229 of the forming device 143 treated with the arrangement illustrated in FIG. 21 at about 1200° C. at about 3 VDC supplied from the voltage power supply during treatment. In this example, the horizontal axis of FIG. 21 represents a real part of the impedance in ohms, and the vertical axis represents an imaginary part of the impedance in ohms. 3 VDC may be applied across the platinum reservoir 355 and the storage electrode 291 up to about one hour. The measured impedances in FIG. 22 show an increase of the arc related to the mobile cations in the arrow direction 361 with increasing durations of treatment to reach the greatest impedance 325 in the impedance measurement. Analysis of the impedance data suggests that the mobile ion-related resistance was increased from about 70 ohms prior to the treatment to about 360 ohms after about one hour of the treatment, which is an increase by a factor of about 5. Since the growing impedance arc reflects the resistivity of the intergranular glass phase 253 with its mobile ions, this increase in resistivity indicates that the intergranular glass phase 253 may have changed.

The resistivity increases substantially during the treatment, and the resistivity of the intergranular glass phase 253 may be controlled by the quantity and mobility of the constituents of the intergranular glass phase 253 during the treatment. Therefore, it can be inferred that the quantity and/or mobility of the mobile ions in the intergranular glass phase 253 may have dramatically decreased. As observed by SEM-EDX in FIG. 11, the intergranular glass phase 393 may be effectively depleted of mobile cations such as, but not limited to, alkaline, alkaline earth, and transition metal ions. The resulting intergranular glass phase 393 may contain only ions with low mobility, which may diffuse at a relatively slower rate into the glass melt, thereby significantly reducing the pollution of the glass melt that occurs during the drawing of glass ribbons. The resulting lower mobility intergranular glass phase also slows down the corrosion of the ceramic body 229 and reduces the creep rates of the ceramic body 229 since both the corrosion and the creep rates of the ceramic body 229 scale with the quantity and mobility of the mobile ions in the intergranular glass phase 393 of the ceramic body 229.

Figure 23:
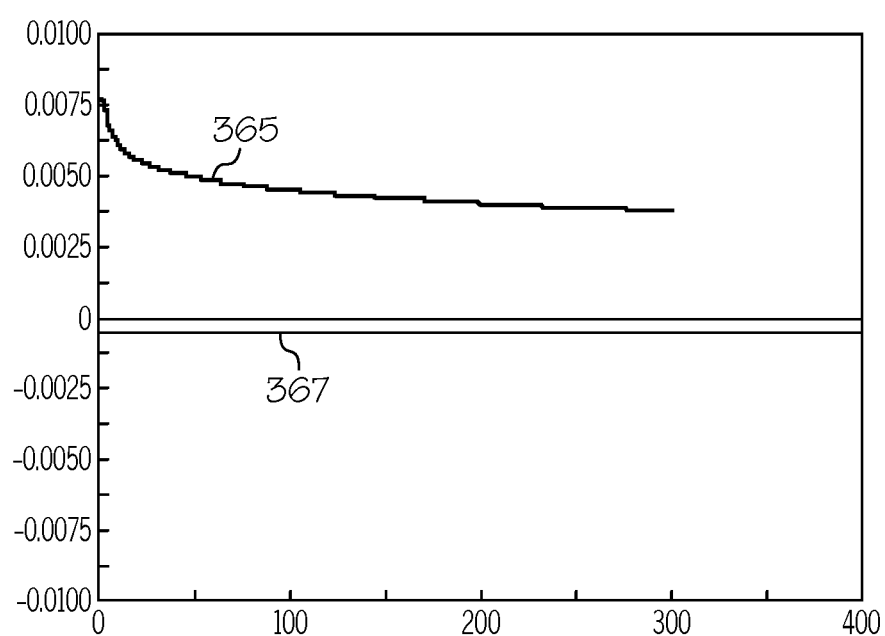
FIG. 23 is a graphical view illustrating an example of the changes in the currents measured for the ceramic body of the forming device of FIG. 2 when treated with the arrangement illustrated in FIG. 21 at about 1200° C.

FIG. 23 is a graphical view illustrating an example of the changes in the currents measured for the ceramic body 229 of the forming device 143 when treated with the arrangement illustrated in FIG. 21 at about 1200° C. The horizontal axis of FIG. 23 represents the period in seconds at which the current was measured. The vertical axis represents the current per unit electrode area (A/cm²). In this example, a starting current at 10 VDC supplied from the voltage power supply 277 for the first 5 minutes may be in the order of 5-7.5 mA/cm². After reversing the polarity of the electrodes and applying −1 VDC between the platinum reservoir 355 and the storage electrode 291, the current polarity is also reversed. As shown in FIG. 23, during a measurement duration of up to about 400 sec, a current of less than 1 mA/cm² may be measured. This suggests that the surface of the ceramic body 229 effectively may already be largely depleted of mobile ions by migrating mobile cations from the forming device 143 into the glass melt, so that, under inversed potential, no significant ion movement is observed, thereby demonstrating that the mobile ions present in the ceramic body 229 proximate the surface may be removed into the glass melt at a greater rate of speed.

Figure 24:
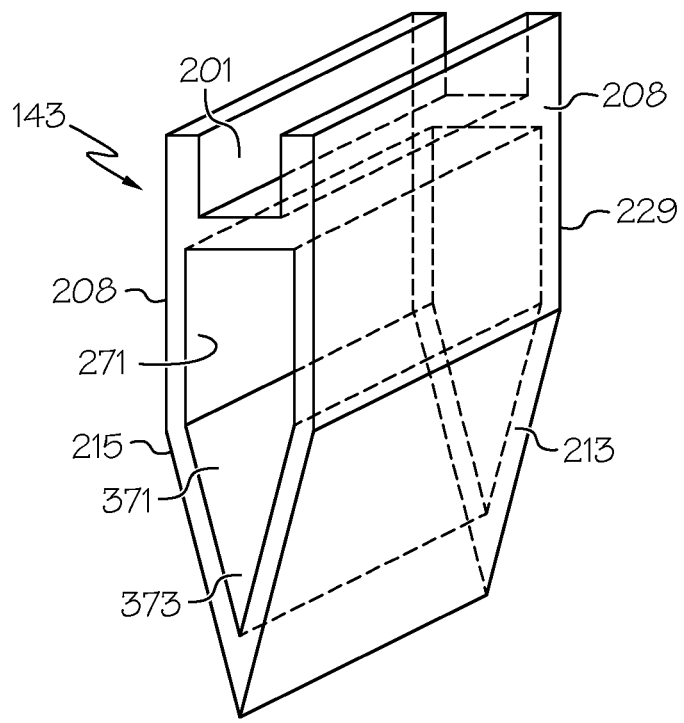
FIG. 24 is a schematic view illustrating an example of the forming device of FIG. 2 with one or more cathodes or anodes formed in the inner wall of the forming device.
Figure 25:
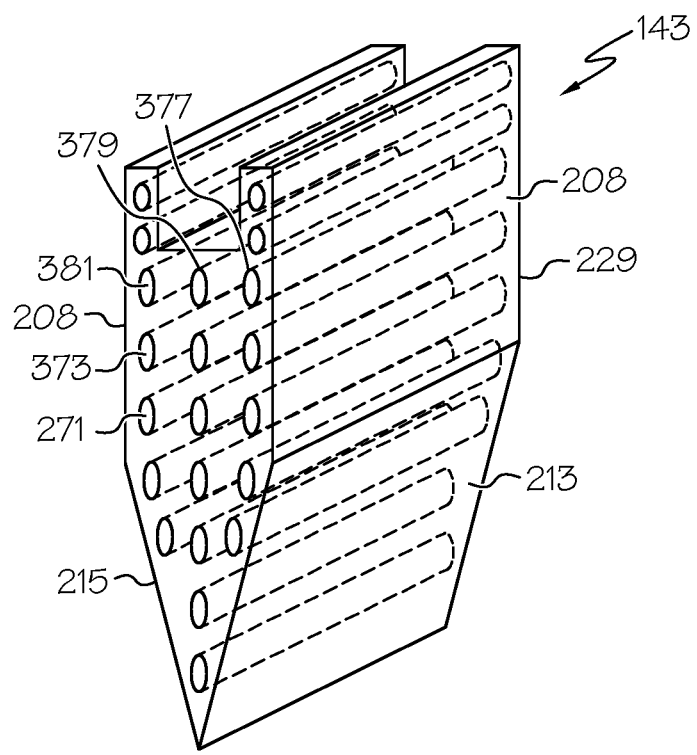
FIG. 25 is a schematic view illustrating an example of the forming device of FIG. 24.

FIGS. 24 and 25 are schematic views illustrating examples of the forming device 143 of FIG. 2 with one or more cathodes or anodes formed in the inner wall of the forming device 143. FIG. 24 illustrates the forming device 143 with an opening 371 formed through the forming device 143 in a direction perpendicular to the flow direction of the glass melt. Alternatively, the ceramic body of the forming device 143 may include one or more bores in a direction perpendicular to the flow direction of the glass melt. The opening 371 may be formed to keep the thickness between an inner wall 373 of the opening 371 and an outer surface 208 or between the inner wall 373 of the opening 371 and downwardly inclined forming surface portions 213, 215 within a predetermined range in all directions. The inner wall 373 may be provided with the cathode that includes the metal electrode or the storage electrode. One or more of the anodes may be configured to be in contact with the glass melt in the forming device 143 as schematically shown in FIGS. 19 and 20. The anodes may be in contact with the glass melt flowing over the trough 201, the downwardly inclined forming surface portions 213, 215, or the outer surface 208.

FIG. 23 is a graphical view illustrating an example of the changes in the currents measured for the ceramic body 229 of the forming device 143 when treated with the arrangement illustrated in FIG. 21 at about 1200° C. The horizontal axis of FIG. 23 represents the period in seconds at which the current was measured. The vertical axis represents the current per unit electrode area (A/cm²). In this example, a starting current 365 at 10 VDC supplied from the voltage power supply 277 for the first 5 minutes may be in the order of 5-7.5 mA/cm². After reversing the polarity of the electrodes and applying −1 VDC between the platinum reservoir 355 and the storage electrode 291, the current polarity is also reversed. As shown in FIG. 23, during a measurement duration of up to about 400 sec, a current 367 of less than 1 mA/cm² may be measured. This suggests that the surface of the ceramic body 229 effectively may already be largely depleted of mobile ions by migrating mobile cations from the forming device 143 into the glass melt, so that, under inversed potential, no significant ion movement is observed, thereby demonstrating that the mobile ions present in the ceramic body 229 proximate the surface may be removed into the glass melt at a greater rate of speed.

FIG. 25 is a schematic view illustrating an example of the forming device 143 of FIG. 24. The forming device 143 includes a plurality of openings respectively oriented in columns 377, 379, and 381 in a direction perpendicular to the flowing direction of the glass melt. The openings of the columns 377, 379, and 381 may be spaced apart with a predetermined gap between adjacent openings. Cathodes 271 may be formed in the inner wall 373 of each of the columns 377, 379, and 381 of the openings by using the metallic conductor or storage electrode as the cathode. One or more of the anodes may be configured to be in contact with the glass melt in the forming device 143 as schematically shown in FIGS. 19 and 20. The anodes may be in contact with the glass melt flowing over the trough 201, the downwardly inclined forming surface portions 213, 215, or the outer surface 208. When a negative electric potential is applied to the cathodes of the openings of the columns 377 and 381, the mobile ions may migrate from the glass melt toward the openings of the columns 377 and 381 in the forming device 143 until the mobile ions are enriched at the inner wall 373 of the openings of the columns 377 and 381. The mobile ions may be forced to migrate toward the openings of the column 379 to rejuvenate the openings 377 and 381 such that the mobile ions from the glass melt may continuously migrate toward the openings 377 and 381. In an example, a negative electric potential is applied to the cathodes in the inner walls 373 of the openings of the column 379 while a negative electric potential is not applied to the cathodes in the inner walls 373 of the openings of the columns 377 and 381.

Similar to FIGS. 19 and 20, the forming device 143 in FIGS. 24 and 25 may be used during flushing and in-situ during glass manufacturing. In one example, in a case in which the impurity ion concentration in the glass melt is found to exceed a predetermined level, the mobile ions are removed from the glass melt by applying negative potential to the cathode 271 formed on the inner wall 373 in FIG. 24 without halting glass manufacturing. In another example, as set forth above for FIG. 21, the polarities of the electrodes in FIGS. 24 and 25 can be inversed to migrate the mobile ions into the glass melt as required in the flushing and in-situ during glass manufacturing.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method of treating a ceramic body in a glass making process, the method comprising:
    heating the ceramic body;
    delivering a molten glass to the ceramic body while the ceramic body is heated, the ceramic body comprising a ceramic phase and an intergranular glass phase, the molten glass being in contact with a surface of the ceramic body;
    contacting the ceramic body with a first electrode;
    contacting the molten glass with a second electrode; and
    applying an electric field between the first electrode and the second electrode to create an electric potential difference across the ceramic body between the first and second electrodes, the electric potential difference being less than an electrolysis threshold of the ceramic phase and the intergranular glass phase, wherein the intergranular glass phase demixes under driven diffusion in the applied electric field and mobile cations in the intergranular glass phase enrich within a bulk of the ceramic body proximate to the first electrode.

2. The method according to claim 1, wherein the ceramic body comprises zircon.

3. The method according to claim 1, wherein the electric potential difference across the ceramic body is equal to or less than about 1.8 V.

4. The method according to claim 1, wherein the electric potential difference across the ceramic body is in a range from about 0.2 V to about 1.8 V.

5. The method according to claim 1, wherein a temperature of the ceramic body during the applying of the electric field is at least about 1000° C.

6. The method according to claim 1, wherein the first electrode comprises platinum.

7. The method according to claim 6, wherein the first electrode further comprises a yttrium-stabilized zirconia.

8. The method according to claim 1, wherein the first electrode comprises a metal oxide.

9. The method according to claim 1, wherein at least one of the first electrode and the second electrode comprises at least one of an electrically conductive ceramic and an electrically conductive carbon.

10. The method according to claim 1, wherein the applying of the electric field comprises inverting polarities on one or more occasions.

11. The method according to claim 1, wherein the ceramic body comprises one or more openings or bores.

12. The method according to claim 11, wherein the one or more openings or bores comprise the first electrode.

13. The method according to claim 1, further comprising removing a portion of the ceramic body proximate to the first electrode that is enriched with mobile cations.

14. The method according to claim 1, further comprising drawing the molten glass from the ceramic body to form a glass ribbon.

* * * * *